US012775632B2

(12) United States Patent
Li et al.

(10) Patent No.: US 12,775,632 B2
(45) Date of Patent: Oct. 27, 2026

(54) DATA MANAGEMENT METHOD, APPARATUS, AND SYSTEM, AND STORAGE MEDIUM

(71) Applicant: Huawei Cloud Computing Technologies Co., Ltd., Gui'an New District (CN)

(72) Inventors: Haifeng Li, Beijing (CN); Hailong Liu, Xi'an (CN); Chuanting Wang, Beijing (CN); Yuzeng Chang, Gui'an (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 18/990,851

(22) Filed: Dec. 20, 2024

(65) Prior Publication Data

US 2025/0117399 A1 Apr. 10, 2025

Related U.S. Application Data

(63) Continuation of application No. PCT/CN2023/100782, filed on Jun. 16, 2023.

(30) Foreign Application Priority Data

Jun. 22, 2022 (CN) ......................... 202210714147.1

(51) Int. Cl.
*G06F 16/27* (2019.01)
*G06F 9/46* (2006.01)
*G06F 16/22* (2019.01)

(52) U.S. Cl.
CPC ............. *G06F 16/27* (2019.01); *G06F 9/466* (2013.01); *G06F 16/2282* (2019.01)

(58) Field of Classification Search
CPC ....................................................... G06F 16/27
(Continued)

(56) References Cited

U.S. PATENT DOCUMENTS 7,640,229 B1 * 12/2009 Kaufmann ........ G06F 16/24565
2007/0130171 A1 * 6/2007 Hanckel .............. G06F 16/2477
(Continued)

FOREIGN PATENT DOCUMENTS

CN 108614892 A 10/2018
CN 114048266 A 2/2022

OTHER PUBLICATIONS

Gupta, "Mastering Oracle GoldenGate," Real-time Replication and Data Transformation, Apress, IOUG Press, Total 649 pages (Nov. 2016).
(Continued)

*Primary Examiner* — Muluemebet Gurmu
(74) *Attorney, Agent, or Firm* — Leydig, Voit & Mayer, Ltd.

(57) ABSTRACT

A data management method, apparatus, and system, and a storage medium are provided which belong to the communication field. The method includes: obtaining first description information, wherein the first description information describes a first row group, the first row group is a row group stored by a first storage system within a specified time period, and the first row group includes at least one row of data; and storing the first row group in a second storage system based on the first description information. According to the application, operation costs and maintenance difficulty can be reduced.

20 Claims, 12 Drawing Sheets

(58) Field of Classification Search
USPC .......................................................... 707/610
See application file for complete search history.

(56) References Cited

U.S. PATENT DOCUMENTS

| | | | | |
|---|---|---|---|---|
| 2010/0185705 | A1* | 7/2010 | Bansal | G06F 16/1847 707/822 |
| 2012/0303628 | A1* | 11/2012 | Silvola | G06F 16/2282 707/E17.049 |
| 2016/0292250 | A1 | 10/2016 | Chen et al. | |
| 2018/0075124 | A1 | 3/2018 | Brodt et al. | |
| 2020/0034365 | A1 | 1/2020 | Martin et al. | |
| 2021/0209088 | A1* | 7/2021 | Zheng | G06F 16/2455 |
| 2021/0286775 | A1 | 9/2021 | Beier et al. | |

OTHER PUBLICATIONS

Choy et al., “Disaster recovery techniques for database systems,” Communications of the ACM, vol. 43, Issue 11, Total 9 pages (Nov. 2000).

Teradata, Developers, URL: https://www.teradata.com/Products/Ecosystem-Management/IntelliSphere/Unity, Teradata.com, Total 2 pages (Downloaded Jan. 7, 2025).

Morton, “Business Continuity and Disaster Recovery,” Mastering Snowflake Solutions, Apress, Berkeley, CA, Total 17 pages (Feb. 2022).

* cited by examiner

DATA MANAGEMENT METHOD, APPARATUS, AND SYSTEM, AND STORAGE MEDIUM

CROSS-REFERENCE TO RELATED APPLICATIONS

This application is a continuation of International Application No. PCT/CN2023/100782, filed on Jun. 16, 2023, which claims priority to Chinese Patent Application No. 202210714147.1, filed on Jun. 22, 2022. The disclosures of the aforementioned applications are hereby incorporated by reference in their entireties.

TECHNICAL FIELD

Embodiments of this application relate to the communication field, and in particular, to a data management method, apparatus, and system, and a storage medium.

BACKGROUND

A database is the core asset of an internet technology (IT) system. The IT system uses the database to store data. Two databases that are far away from each other are created, and mutual redundancy is performed between the two databases, so that data stored in the two databases is consistent, thereby ensuring data security in the IT system. In this way, when one database stops working due to an accident (such as a fire or an earthquake), the other database continues to provide a service.

For ease of description, the two databases are respectively referred to as a first database and a second database. An agent module is disposed at a structured query language (SQL) access layer of the IT system. The IT system receives an SQL statement used to store data, and the agent module of the IT system stores same data in the first database and the second database based on the SQL statement. In this way, data stored in the first database is consistent with data stored in the second database.

Currently, the SQL access layer needs to be reconstructed, to include the agent module in the SQL access layer, so that the agent module synchronously stores same data in the two databases based on the received SQL statement. However, it is difficult to reconstruct the SQL access layer, operation costs are high, and maintenance is difficult.

SUMMARY

Embodiments of this application provide a data management method, apparatus, and system, and a storage medium, to reduce operation costs and maintenance difficulty. The technical solutions are as follows.

According to a first aspect, this application provides a data management method. In the method, first description information is obtained, where the first description information is used to describe a first row group, the first row group is a row group stored by a first storage system within a specified time period, and the first row group includes at least one row of data; and the first row group is stored in a second storage system based on the first description information.

Because the first description information is used to describe the first row group, and the first row group is a row group stored by the first storage system within the specified time period, the first row group stored in the first storage system can be obtained based on the first description information. In other words, after the first storage system completes a process of storing the first row group, the first description information is obtained, the first row group is obtained from the first storage system based on the first description information, and the first row group is stored in the second storage system, thereby ensuring that data in the first storage system is consistent with data in the second storage system. In this way, a process in which the first storage system stores data is not modified, that is, an SQL access layer of the first storage system does not need to be modified, thereby reducing operation costs and maintenance difficulty.

In a possible implementation, the first description information includes transaction information of a first transaction, and the first transaction is a transaction whose execution has been completed by the first storage system within the specified time period. The first transaction is determined; and the first description information including the transaction information of the first transaction is selected from description information that has been generated by the first storage system. Because the first transaction is a transaction whose execution has been completed by the first storage system within the specified time period, the first description information newly added by the first storage system within the specified time period may be obtained based on the first transaction, and the first row group newly added by the first storage system within the specified time period is obtained based on the first description information.

In another possible implementation, a first transaction set is obtained, where the first transaction set includes a transaction that is executed by the first storage system at an end moment of the specified time period, and the first transaction set is used to reflect a transaction whose execution has been completed by the first storage system before the end moment; and the first transaction is determined based on the first transaction set. Because the first transaction set is used to reflect a transaction whose execution has been completed by the first storage system before the end moment, the first transaction whose execution has been completed by the first storage system within the specified time period can be accurately obtained by using the first transaction set.

In another possible implementation, a second transaction set is obtained, where the second transaction set includes a transaction that is executed by the first storage system at a start moment of the specified time period, and the second transaction set is used to reflect a transaction whose execution has been completed by the first storage system before the start moment; and the first transaction is determined based on the first transaction set and the second transaction set. Because the first transaction set is used to reflect a transaction whose execution has been completed by the first storage system before the end moment, and the second transaction set is used to reflect a transaction whose execution has been completed by the first storage system before the start moment, the first transaction whose execution has been completed by the first storage system within the specified time period can be accurately obtained by using the first transaction set and the second transaction set.

In another possible implementation, based on a row group range, at least one piece of description information is selected from the description information that has been generated by the first storage system, where the row group range includes a row group operated by the first storage system within the specified time period, and a row group corresponding to a group identifier included in each piece of description information in the at least one piece of description information belongs to the row group range; and the first description information including the transaction information of the first transaction is selected from the at least one piece of description information.

Because the at least one piece of description information is selected by using the row group range, and then the first description information including the transaction information of the first transaction is selected from the at least one piece of description information, in a process of selecting the first description information, an amount of description information that needs to be analyzed can be reduced, thereby improving efficiency of obtaining the first description information.

In another possible implementation, the first description information includes a storage location of a data segment corresponding to the first row group, the data segment includes data in the first row group, and the first storage system and the second storage system are storage systems of a same type. The data segment is obtained based on the storage location; and a file is sent to the second storage system, where the file includes the data segment, and the file is used to trigger the second storage system to store the data segment.

Because the first storage system and the second storage system are storage systems of a same type, a manner in which the first storage system stores the first row group should be the same as a manner in which the second storage system stores the first row group. Because the file includes the data segment, the second storage system may store the data segment, so that the manner in which the first storage system stores the first row group is the same as the manner in which the second storage system stores the first row group, thereby avoiding a storage error.

In another possible implementation, the file further includes first row status information, the first row status information indicates undeleted data in the first row group, and the file is further used to trigger the second storage system to store the first row status information or delete deleted data in the first row group from the data segment based on the first row status information. In this way, by using the first row status information, the first row group stored by the first storage system is consistent with the first row group stored by the second storage system.

In another possible implementation, the file further includes a group identifier of the first row group and/or a column identifier corresponding to each column of data in the first row group, the file is further used to trigger the second storage system to obtain second description information based on the group identifier of the first row group and the column identifier corresponding to each column of data, and the second description information is used to describe the first row group. Because the second description information is used to describe the first row group, it is convenient for the second storage system to restore the first row group based on the second description information.

In another possible implementation, the file further includes statistics information corresponding to each column of data, and the second description information further includes the statistics information corresponding to each column of data. The statistics information of each column of data may be used to help the second storage system quickly query required data from a data table. The data table is a data table to which the first row group belongs. This can improve data query efficiency.

In another possible implementation, the first description information includes a group identifier of the first row group and a storage location of a data segment corresponding to the first row group, and the data segment includes data in the first row group. The first row group is obtained based on the group identifier and the storage location; and an insert statement is sent to the second storage system, where the insert statement includes each row of data in the first row group, and the insert statement is used to trigger the second storage system to store each row of data in the first row group. Because the obtained insert statement includes each row of data in the first row group, the second storage system receives the insert statement, and can quickly store the first row group in the second storage system by executing the insert statement.

In another possible implementation, third description information is obtained, where the third description information is used to describe at least one row of data deleted by the first storage system from a second row group within the specified time period, the second row group is a row group stored in the first storage system, and the second storage system stores the second row group; and the at least one row of data stored in the second storage system is deleted based on the third description information. Because the first storage system deletes the at least one row of data within the specified time period, and deletes, based on the third description information, the at least one row of data stored in the second storage system, it is ensured that data stored in the first storage system is consistent with data stored in the second storage system.

In another possible implementation, the first storage system and the second storage system are storage systems of a same type, the third description information includes a group identifier of the second row group and second row status information, and the second row status information indicates the at least one row of data. Because the second row status information indicates the at least one row of data, the third description information is sent to the second storage system, so that the second storage system can delete the at least one row of data based on the third description information, thereby ensuring that data stored in the first storage system is consistent with data stored in the second storage system.

In another possible implementation, the third description information includes a group identifier of the second row group and second row status information, and the second row status information indicates the at least one row of data. A row identifier of each row of data in the at least one row of data is obtained based on the group identifier and the second row status information; and a delete statement is sent to the second storage system, where the delete statement includes the row identifier of each row of data, and the delete statement is used to trigger the second storage system to delete the at least one row of data. Because the first storage system deletes the at least one row of data within the specified time period, and the delete statement includes the row identifier of each row of data in the at least one row of data, the second storage system deletes, based on the delete statement, the at least one row of data stored in the second storage system, thereby ensuring that data stored in the first storage system is consistent with data stored in the second storage system.

In another possible implementation, the first storage system is a database system or a data warehouse system, and the second storage system is a database system or a data warehouse system.

In another possible implementation, each row of data in the first row group is data of a specified service. The specified service may be a critical service. In this way, data of the critical service may be backed up by using the second storage system.

According to a second aspect, this application provides a data management method. In the method, a first row group is received, where the first row group is obtained by a first storage system based on first description information, the first description information is used to describe the first row group, the first row group is a row group stored by the first storage system within a specified time period, and the first row group includes at least one row of data; and the first row group is stored in a second storage system.

Because the first description information is used to describe the first row group, and the first row group is a row group stored by the first storage system within the specified time period, the first row group is received and the first row group is stored in the second storage system, thereby ensuring that data in the first storage system is consistent with data in the second storage system. Because the first row group is obtained from the first storage system based on the first description information after the first storage system stores the first row group, a process in which the first storage system stores data does not need to be changed, that is, an SQL access layer of the first storage system does not need to be modified, thereby reducing operation costs and maintenance difficulty.

In a possible implementation, the first storage system and the second storage system are systems of a same type. A file is received, where the file includes a data segment corresponding to the first row group, and the data segment includes the at least one row of data in the first row group; and the data segment is stored in the second storage system.

Because the first storage system and the second storage system are storage systems of a same type, a manner in which the first storage system stores the first row group should be the same as a manner in which the second storage system stores the first row group. Because the file includes the data segment, the second storage system may store the data segment, so that the manner in which the first storage system stores the first row group is the same as the manner in which the second storage system stores the first row group, thereby avoiding a storage error.

In another possible implementation, second description information is generated, where the second description information is used to describe the first row group; and the second description information is stored by using the second storage system. Because the second description information is used to describe the first row group, it is convenient for the second storage system to restore the first row group based on the second description information.

In another possible implementation, the file further includes a group identifier of the first row group and/or a column identifier corresponding to each column of data in the first row group, the second description information includes the group identifier of the first row group and a storage location of the data segment, and the storage location is obtained based on the column identifier corresponding to each column of data.

In another possible implementation, the file further includes statistics information corresponding to each column of data in the first row group, and the second description information further includes the statistics information corresponding to each column of data. The statistics information of each column of data may be used to help the second storage system quickly query required data from a data table. The data table is a data table to which the first row group belongs. This can improve data query efficiency.

In another possible implementation, the file further includes first row status information, and the first row status information indicates undeleted data in the first row group. The first row status information is stored by using the second storage system; or deleted data in the first row group is deleted from the data segment based on the first row status information. In this way, by using the first row status information, the first row group stored by the first storage system is consistent with the first row group stored by the second storage system.

In another possible implementation, an insert statement is received, where the insert statement includes each row of data in the first row group; and each row of data in the first row group is stored in the second storage system. Because the insert statement includes each row of data in the first row group, the first row group can be quickly stored in the second storage system by executing the insert statement, thereby improving storage efficiency.

In another possible implementation, third description information is received, where the third description information is used to describe at least one row of data deleted by the first storage system from a second row group within the specified time period, the second row group is a row group stored in the first storage system, and the second storage system stores the second row group; and the at least one row of data stored in the second storage system is deleted based on the third description information. Because the first storage system deletes the at least one row of data within the specified time period, and deletes, based on the third description information, the at least one row of data stored in the second storage system, it can be ensured that data stored in the first storage system is consistent with data stored in the second storage system.

In another possible implementation, a delete statement is received, where the delete statement includes a row identifier of each row of data in at least one row of data in a second row group, the at least one row of data in the second row group is data that is deleted by the first storage system within the specified time period, the second row group is a row group stored in the first storage system, and the second storage system stores the second row group; and each row of data is deleted from the second storage system based on the row identifier of each row of data. Because the delete statement includes the row identifier of each row of data in the second row group that is deleted by the first storage system within the specified time period, the at least one row of data stored in the second storage system can be quickly deleted based on the delete statement, thereby improving deletion efficiency.

In another possible implementation, each row of data in the first row group is data of a specified service.

In another possible implementation, the first storage system is a database system or a data warehouse system, and the second storage system is a database system or a data warehouse system.

According to a third aspect, this application provides a data management method. In the method, a first storage system obtains first description information, where the first description information is used to describe a first row group, the first row group is a row group stored by the first storage system within a specified time period, and the first row group includes at least one row of data; the first storage system sends the first row group to a second storage system based on the first description information; and the second storage system stores the first row group.

Because the first description information is used to describe the first row group, and the first row group is a row group stored by the first storage system within the specified time period, the first storage system can obtain, based on the first description information, the first row group stored in the first storage system. In other words, after the first storage system stores the first row, the first description information is obtained, the first row group is obtained from the first storage system based on the first description information, and the first row group is stored in the second storage system. In this way, a process in which the first storage system stores data does not need to be changed, that is, an SQL access layer of the first storage system does not need to be modified, thereby reducing operation costs and maintenance difficulty.

In a possible implementation, the first description information includes transaction information of a first transaction, and the first transaction is a transaction whose execution has been completed by the first storage system within the specified time period. The first storage system determines the first transaction; and selects, from description information that has been generated by the first storage system, the first description information including the transaction information of the first transaction. Because the first transaction is a transaction whose execution has been completed by the first storage system within the specified time period, the first description information newly added by the first storage system within the specified time period may be obtained based on the first transaction, and the first row group newly added by the first storage system within the specified time period is obtained based on the first description information.

In another possible implementation, the first description information includes a storage location of a data segment corresponding to the first row group, the data segment includes data in the first row group, and the first storage system and the second storage system are storage systems of a same type. The first storage system obtains the data segment based on the storage location, and sends a file to the second storage system, where the file includes the data segment; and the second storage system stores the data segment. Because the file includes the data segment, the second storage system may store the data segment, so that it is ensured that a manner in which the first storage system stores the first row group is the same as a manner in which the second storage system stores the first row group, thereby avoiding a storage error.

In another possible implementation, the first description information includes a group identifier of the first row group and a storage location of a data segment corresponding to the first row group, and the data segment includes data in the first row group. The first storage system obtains the first row group based on the group identifier and the storage location, and sends an insert statement to the second storage system, where the insert statement includes each row of data in the first row group; and the second storage system stores each row of data in the first row group. Because the insert statement obtained by the first storage system includes each row of data in the first row group, the second storage system receives the insert statement, so that the first row group can be quickly stored in the second storage system by executing the insert statement, thereby improving data storage efficiency.

According to a fourth aspect, this application provides a data management apparatus, configured to perform the method according to any one of the first aspect or the possible implementations of the first aspect. Specifically, the apparatus includes units configured to perform the method according to any one of the first aspect or the possible implementations of the first aspect.

According to a fifth aspect, this application provides a data management apparatus, configured to perform the method according to any one of the second aspect or the possible implementations of the second aspect. Specifically, the apparatus includes units configured to perform the method according to any one of the second aspect or the possible implementations of the second aspect.

According to a sixth aspect, this application provides a computing device cluster, including at least one computing device. Each computing device includes a processor and a memory, and the processor in the at least one computing device is configured to execute instructions stored in the memory in the at least one computing device, so that the computing device cluster performs the method according to any one of the first aspect or the possible implementations of the first aspect.

According to a seventh aspect, this application provides a computing device cluster, including at least one computing device. Each computing device includes a processor and a memory, and the processor in the at least one computing device is configured to execute instructions stored in the memory in the at least one computing device, so that the computing device cluster performs the method according to any one of the second aspect or the possible implementations of the second aspect.

According to an eighth aspect, this application provides a computer program product including instructions. When the instructions are run by a computing device cluster, the computing device cluster is enabled to perform the method according to any one of the first aspect, the second aspect, the possible implementations of the first aspect, or the possible implementations of the second aspect.

According to a ninth aspect, this application provides a computer-readable storage medium, configured to store a computer program. When the computer program is executed by a computing device cluster, the computing device cluster performs the method according to any one of the first aspect, the second aspect, the possible implementations of the first aspect, or the possible implementations of the second aspect.

According to a tenth aspect, this application provides a chip, including a memory and a processor. The memory is configured to store computer instructions, and the processor is configured to invoke the computer instructions from the memory and run the computer instructions, to perform the method according to any one of the first aspect, the second aspect, the possible implementations of the first aspect, or the possible implementations of the second aspect.

According to an eleventh aspect, this application provides a data management system. The system includes the apparatus according to the fourth aspect and the apparatus according to the fifth aspect; or the system includes the computing device cluster according to the sixth aspect and the computing device cluster according to the seventh aspect.

DESCRIPTION OF EMBODIMENTS

The following further describes in detail implementations of this application with reference to accompanying drawings.

Figure 1:
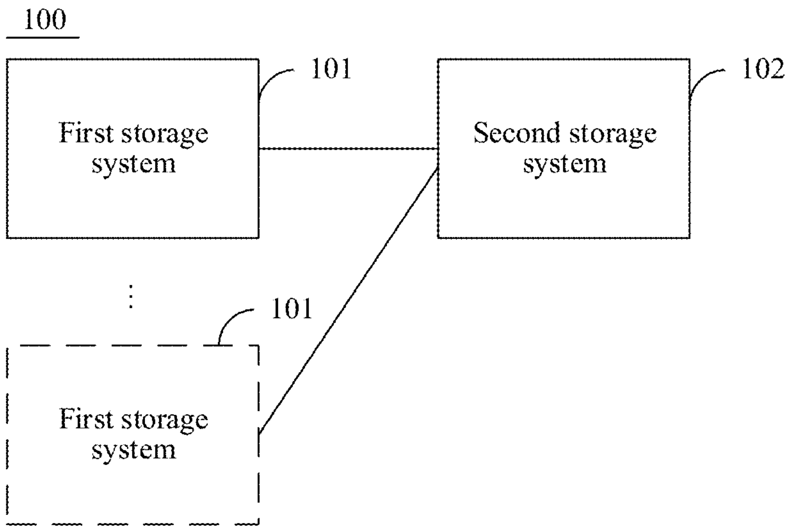
FIG. 1 is a diagram of a structure of a data management system according to an embodiment of this application.

Refer to FIG. 1, an embodiment of this application provides a data management system 100. The system 100 includes a first storage system 101 and a second storage system 102, and the first storage system 101 communicates with the second storage system 102.

In some embodiments, the second storage system 102 is a backup system of the first storage system 101, and the second storage system 102 is configured to back up a part or all of data in the first storage system 101.

In some embodiments, the data management system 100 includes a plurality of first storage systems 101, and each first storage system 101 communicates with the second storage system 102. The second storage system 102 is configured to back up a part or all of data in each first storage system 101.

In some embodiments, the first storage system 101 may be a bare metal server, a device cluster, or the like, and the second storage system 102 may be a bare metal server, a device cluster, or the like.

In some embodiments, the first storage system 101 is a database system or a data warehouse system, and the second storage system 102 is a database system or a data warehouse system.

In some embodiments, the first storage system 101 and the second storage system 102 are storage systems of a same type, and a data storage manner used by the first storage system 101 is the same as a data storage manner used by the second storage system 102. For example, the first storage system 101 stores data in a columnstore manner, and the second storage system 102 also stores data in the columnstore manner.

In some embodiments, the first storage system 101 and the second storage system 102 are storage systems of different types, and a data storage manner used by the first storage system 101 is the same as or different from a data storage manner used by the second storage system 102. For example, the first storage system 101 stores data in a columnstore manner, and the second storage system 102 also stores data in the columnstore manner; or the first storage system 101 stores data in a columnstore manner, and the second storage system 102 stores data in a manner other than the columnstore manner.

The first storage system 101 includes at least one data table. The at least one data table is in one-to-one correspondence with at least one service. For a data table corresponding to any service, the data table is used to store data that belongs to the service.

An access operation on the first storage system 101 includes at least one basic operation, and the at least one basic operation includes an insert operation, a deletion operation, and a query operation. The insert operation is used to store data in the first storage system 101, the deletion operation is used to delete data from the first storage system 101, and the query operation is used to query data in the first storage system 101.

For example, for an update operation, the update operation is used to update data in the first storage system 101, and a basic operation that forms the update operation includes a deletion operation and an insert operation. It is assumed that the first storage system 101 includes a data table "Table1" shown in Table 1, and the data table "Table1" is used to store a correspondence between a name and an age. The first storage system 101 receives an update statement, where the update statement is shown as follows:

Update Table1
Set Age=21
Where Name=Name 1.

The update statement is used to update a row of data including Name 1 and Age "20" in Table 1 to a row of data including Name 1 and Age "21". After receiving the update statement, the first storage system 101 performs an update operation based on the update statement, to be specific, the first storage system 101 deletes, from the data table "Table1" shown in Table 1, the row of data including Name 1 and the age "20", and inserts, into the data table "Table1" shown in Table 1, the row of data including Name 1 and Age "21", as shown in Table 2. In other words, the update operation can be split into a deletion operation and an insert operation.

TABLE 1

| Name (name) | Age (age) |
|---|---|
| Name 1 | 20 |
| Name 2 | 22 |
| . . . | . . . |

TABLE 2

| Name (name) | Age (age) |
|---|---|
| Name 2 | 22 |
| Name 1 | 21 |
| . . . | . . . |

The insert operation and the deletion operation can change data stored in the first storage system 101. For example, the insert operation is used to store data in the first storage system 101, and the deletion operation is used to delete data from the first storage system 101.

In some embodiments, storing data in the first storage system 101 is essentially storing one or more rows of data in a data table in the first storage system 101; and deleting data from the first storage system 101 is essentially deleting one or more rows of data from a data table in the first storage system 101.

A data table in the first storage system 101 is a logical table. The data table corresponds to at least one file. The first storage system 101 compresses data in the data table into at least one data segment, and stores the at least one data segment in the at least one file corresponding to the data table. In this way, storage space can be saved. Optionally, the data table corresponds to one file. The first storage system 101 compresses the data in the data table into at least one data segment, and stores the at least one data segment in the file corresponding to the data table. Alternatively, each column in the data table corresponds to one file, and data included in any column in the data table is compressed into at least one data segment, and the at least one data segment is stored in the file corresponding to the column.

In some embodiments, the first storage system 101 receives one or more rows of data that need to be stored, caches each row of received data, and when caching N rows of data, uses the N rows of data as a first row group, where N is a specified value, and N is an integer greater than 0. Each row of data in the first row group is data that belongs to a same service, that is, each row of data in the first row group is data that belongs to a data table corresponding to the service.

Optionally, the first storage system 101 includes one file corresponding to the data table, compresses the first row group into one data segment, and stores the data segment in the file corresponding to the data table, so as to store the first row group.

Optionally, the first storage system 101 includes a plurality of files corresponding to the data table, the plurality of files are in one-to-one correspondence with a plurality of columns in the data table, and a file corresponding to any column is used to store data included in the column. The first row group is compressed into a plurality of data segments, a plurality of columns in the first row group are in one-to-one correspondence with the plurality of data segments, a data segment corresponding to any column is used to store data included in the column in the first row group, and a data segment corresponding to each column is stored in a file corresponding to each column in the data table, so as to store the first row group.

Figure 7:
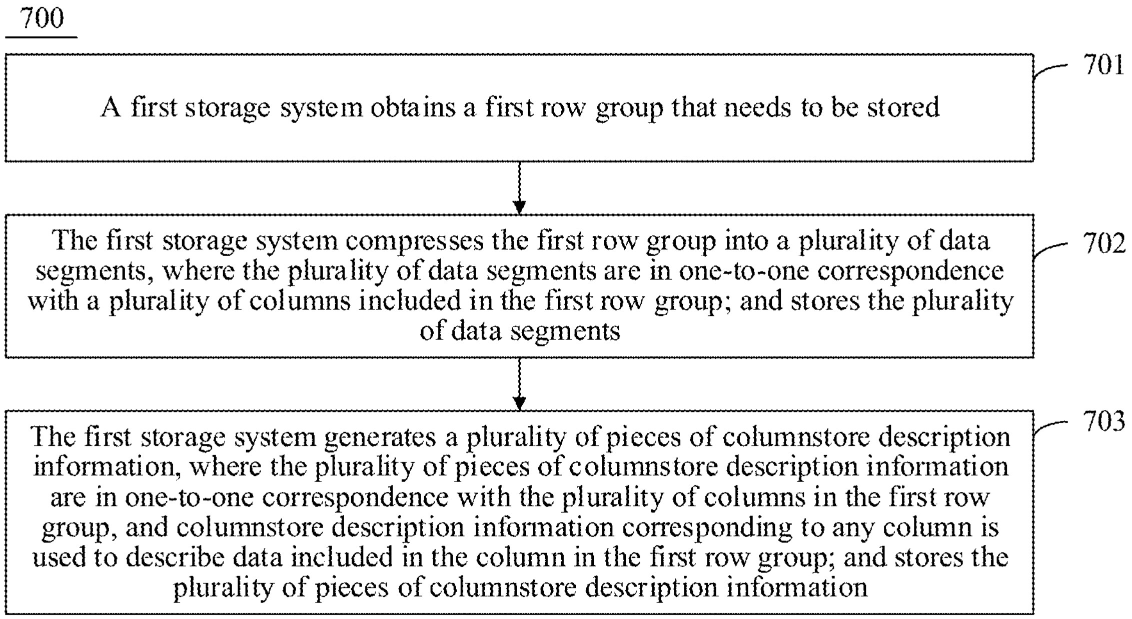
FIG. 7 is a flowchart of a data storage method according to an embodiment of this application.
Figure 9:
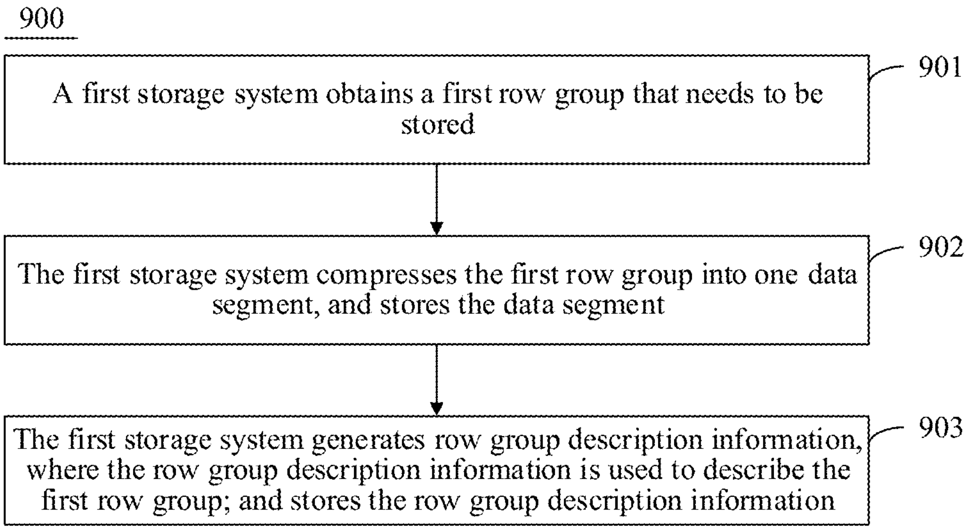
FIG. 9 is a flowchart of another data storage method according to an embodiment of this application.

A detailed implementation process in which the first storage system 101 stores the first row group is described in detail in an embodiment shown in FIG. 7 or FIG. 9, and is not described herein.

N is a predefined quantity of rows included in the row group.

In some embodiments, the first storage system 101 receives a delete statement, where the delete statement includes identification information of the data table and a deletion condition. The first storage system 101 obtains, based on the identification information, at least one file corresponding to the data table, restores the data table based on the at least one file, and deletes, from the data table, at least one row of data that meets the deletion condition. A detailed implementation process in which the first storage system 101 deletes the at least one row of data is described in an embodiment shown in FIG. 11, and is not described herein.

For example, the first storage system 101 receives the following delete statement, where the delete statement includes identification information "Table1" of the data table and a deletion condition "Name=Name 1", and the delete statement is used to indicate to delete, from Table1, at least one row of data that is Name 1 in a name column:

Delete Form Table1

Where Name=Name 1.

The first storage system 101 obtains, based on "Table1", two files corresponding to the data table "Table1", where the two files include a file corresponding to the name column and a file corresponding to an age column. Based on the file corresponding to the name column and the file corresponding to the age column, the data table "Table1" is restored, and the at least one row of data that is Name 1 in the name column is deleted.

In some embodiments, a row group stored in the first storage system 101 is periodically stored in the second storage system 101. In other words, a row group stored in the first storage system 101 in any periodicity is stored in the second storage system 102; and/or at least one row of data deleted by the first storage system 101 in the periodicity is determined, and the at least one row of data is deleted from the second storage system 102, so that data stored in the first storage system 101 is consistent with data stored in the second storage system 102.

Figure 2:
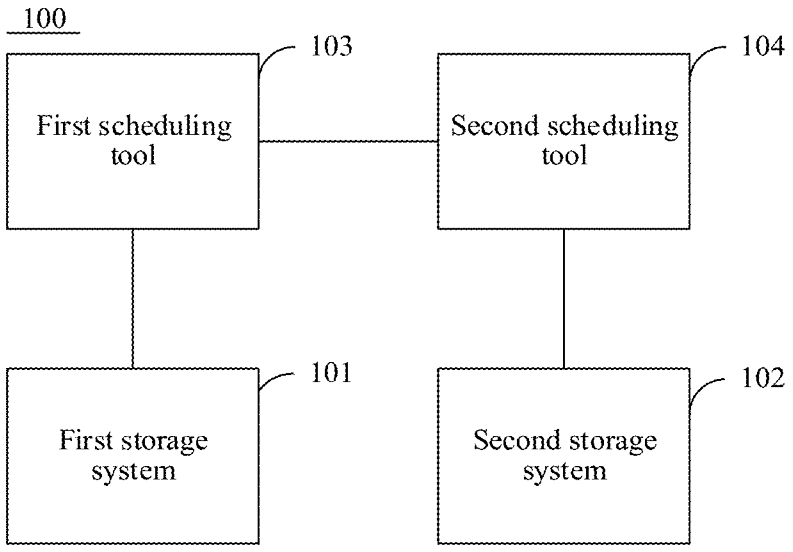
FIG. 2 is a diagram of a structure of another data management system according to an embodiment of this application.

In some embodiments, refer to FIG. 2, the system 100 further includes a first scheduling tool 103 and a second scheduling tool 104. The first scheduling tool 103 communicates with the first storage system 101, the second scheduling tool 104 communicates with the second storage system 102, and the first scheduling tool 103 communicates with the second scheduling tool 104. The first scheduling tool 103 obtains a row group stored by the first storage system 101 in the periodicity, and sends the row group to the second scheduling tool 104, and the second scheduling tool 104 stores the row group in the second storage system 102; and/or the first scheduling tool 103 determines at least one row of data deleted by the first storage system 101 in the periodicity, and notifies the second scheduling tool 104 of the at least one row of data, and the second scheduling tool 104 deletes the at least one row of data from the second storage system 102.

Figure 3:
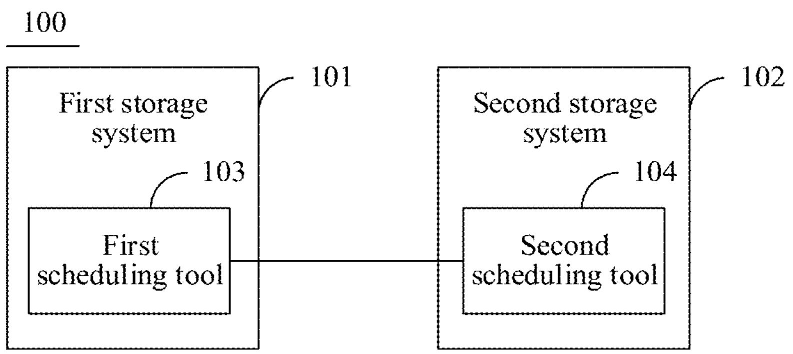
FIG. 3 is a diagram of a structure of another data management system according to an embodiment of this application.

In some embodiments, refer to FIG. 3, the first scheduling tool 103 is a part of the first storage system 101. For example, the first scheduling tool 103 is a module in the first storage system 101, or the first scheduling tool 103 is a device in the first storage system 101. The second scheduling tool 104 is a part of the second storage system 102. For example, the second scheduling tool 104 is a module in the second storage system 102, or the second scheduling tool 104 is a device in the second storage system 102. The first storage system 101 obtains, by using the first scheduling tool 103, a row group stored by the first storage system 101 in the periodicity, and sends the row group to the second storage system 102, and the second storage system 102 stores the row group in the second storage system 102 by using the second scheduling tool 104; and/or the first storage system 101 determines, by using the first scheduling tool 103, at least one row of data deleted by the first storage system 101 in the periodicity, and notifies the second storage system 102 of the at least one row of data, and the second storage system 102 deletes the at least one row of data from the second storage system 102 by using the second scheduling tool 104.

Figure 4:
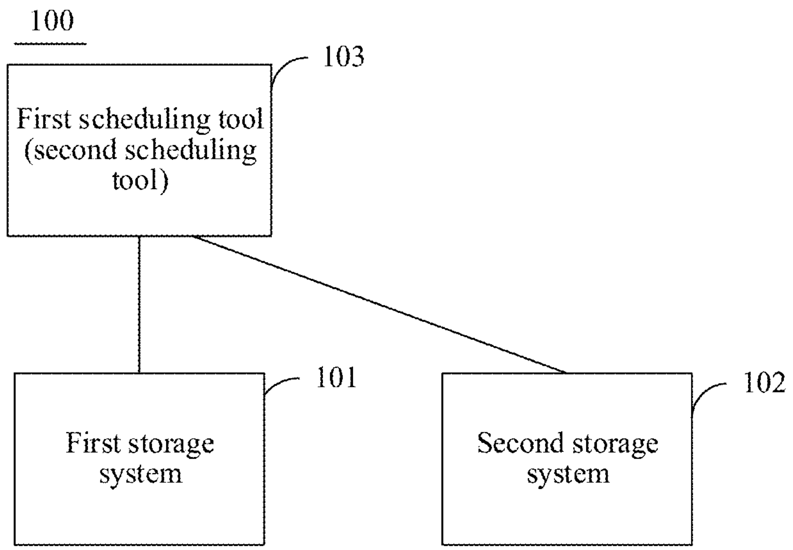
FIG. 4 is a diagram of a structure of another data management system according to an embodiment of this application.

In some embodiments, refer to FIG. 4, the first scheduling tool 103 and the second scheduling tool 104 are a same device, and the first scheduling tool 103 (the second scheduling tool 104) communicates with the first storage system 101 and the second storage system 102. The first scheduling tool 103 obtains a row group stored by the first storage system 101 in the periodicity, and stores the row group in the second storage system 102; and/or the first scheduling tool 103 determines at least one row of data deleted by the first storage system 101 in the periodicity, and deletes the at least one row of data from the second storage system 102.

In some embodiments, the first storage system 101 and the second storage system 102 may be located in a same area, or may be located in different areas.

Figure 5:
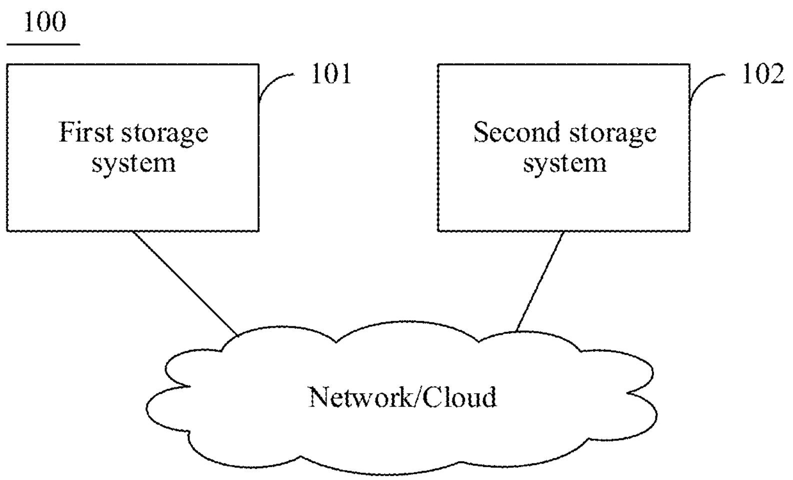
FIG. 5 is a diagram of a structure of another data management system according to an embodiment of this application.
Figure 6:
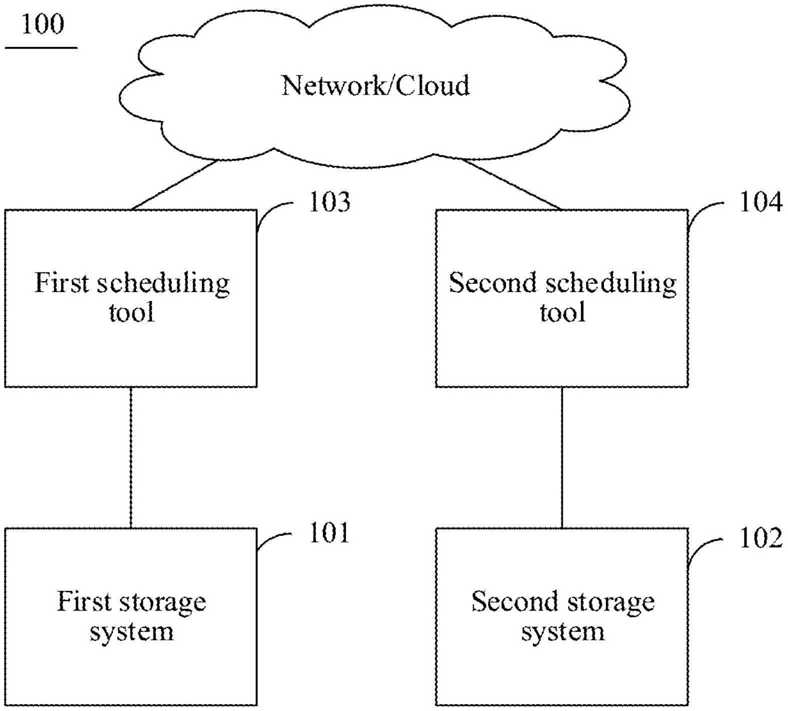
FIG. 6 is a diagram of a structure of another data management system according to an embodiment of this application.

When the first storage system 101 and the second storage system 102 are located in a same area, an availability zone (AZ) in which the first storage system 101 is located and an AZ in which the second storage system 102 is located are different. Optionally, refer to FIG. 5, the first storage system 101 and the second storage system 102 communicate with each other through a network; or refer to FIG. 6, for the first scheduling tool 103 that communicates with the first storage system 101 and the second scheduling tool 104 that communicates with the second storage system 102, the first scheduling tool 103 and the second scheduling tool 104 communicate with each other through a network. Optionally, the AZ includes a data center or the like.

When the first storage system 101 and the second storage system 102 are located in different areas, the first storage system 101 and the second storage system 102 communicate with each other through a network or a cloud. Optionally, refer to FIG. 5, the first storage system 101 and the second storage system 102 communicate with each other through a network or a cloud; or refer to FIG. 6, for the first scheduling tool 103 that communicates with the first storage system 101 and the second scheduling tool 104 that communicates with the second storage system 102, the first scheduling tool 103 and the second scheduling tool 104 communicate with each other through a network or a cloud. Optionally, the cloud is a public cloud, a private cloud, a hybrid cloud, or the like.

The first storage system 101 and the second storage system 102 are located in different areas. If the first storage system 101 cannot be used due to a disaster in an area in which the first storage system 101 is located, but no disaster occurs in an area in which the second storage system 102 is located, the second storage system 102 is normal. In this way, the second storage system 102 can be used to provide a service, thereby improving service availability.

Refer to FIG. 7, an embodiment of this application provides a data storage method 700. The method 700 is applied to the system 100 shown in FIG. 1, FIG. 2, FIG. 3, FIG. 4, FIG. 5, or FIG. 6. In the method 700, a first storage system stores data in a columnstore manner. To be specific, the first storage system compresses a row group that needs to be stored into a plurality of data segments, where the plurality of data segments are in one-to-one correspondence with a plurality of columns of the row group, and a data segment corresponding to any column is used to store data included in the column in the row group; and stores the plurality of data segments. The method 700 includes a procedure of steps 701 to 703.

Step 701: The first storage system obtains a first row group that needs to be stored.

The first storage system receives one or more rows of data that need to be stored, caches the one or more rows of received data, and when a quantity of cached rows reaches N, forms the N rows of data that need to be stored into the first row group.

In some embodiments, when forming the first row group, the first storage system further allocates a group identifier to the first row group, where the group identifier identifies the first row group in the first storage system.

In some embodiments, the N rows of data are data of a same service, and the N rows of data are data in a data table corresponding to the service. Optionally, the first storage system receives one or more rows of data that need to be stored in a data table, caches the one or more rows of data in cache space corresponding to the data table, and when the N rows of data are cached in the cache space, forms the N rows of data into the first row group.

In some embodiments, the first storage system receives an insert statement, where the insert statement includes identification information of a data table and one or more rows of data that need to be stored, and the insert statement is used to indicate the first storage system to store the one or more rows of data in the data table. The first storage system caches, based on the identification information of the data table, the one or more rows of data included in the insert statement in cache space corresponding to the data table; and/or the first storage system receives an update statement used to update the data table, where the update statement is used to trigger the first storage system to update X rows of data stored in the data table to Y rows of data indicated by the update statement, both X and Y are integers greater than 0, and the Y rows of data are data that needs to be stored; and caches, in the cache space corresponding to the data table, the Y rows of data indicated by the update statement.

For example, the first storage system receives the following insert statement:

Insert into Table1 (Name, Age)

Values (Name 3, 25), (Name 4, 22), (Name 5, 25), (Name 6, 27), (Name 7, 24), (Name 8, 30).

The insert statement is used to store six rows of data in Table1 shown in Table 3. The first storage system receives the insert statement, and caches the six rows of data in the insert statement in cache space corresponding to Table1, where the six rows of data are (Name 3, 25), (Name 4, 22), (Name 5, 25), (Name 6, 27), (Name 7, 24), and (Name 8, 30).

For another example, the first storage system receives the following update statement:

Update Table1

Set Age=21

Where Name=Name 1.

The update statement is used to update at least one row of data that includes Name 1 and that is stored in Table1 shown in Table 1 to one row of data that includes Name 1 and Age "21". The row of data including Name 1 and Age "21" is a row of data that needs to be stored. After receiving the update statement, the first storage system deletes the at least one row of stored data including Name 1 from Table 1, and caches, in the cache space corresponding to Table1, the row of data including Name 1 and Age "21".

In some embodiments, after obtaining the first row group, the first storage system allocates a first transaction to the first row group, and executes the first transaction, where the first transaction indicates time for storing the first row group. A process in which the first storage system executes the first transaction is essentially a process in which the first storage system stores the first row group. That the first storage system has completed execution of the first transaction indicates that the first storage system has completed storage of the first row group.

In some embodiments, the first storage system includes a transaction manager. After the first storage system obtains the first row group, the transaction manager generates the first transaction for the first row group, and allocates a transaction number of the first transaction. Optionally, the transaction manager allocates a transaction number to each generated transaction in ascending order of transaction numbers. For example, a transaction number allocated to a $1^{st}$ transaction generated is T0, a transaction number allocated to a $2^{nd}$ transaction generated is T1, and a transaction number allocated to a $3^{rd}$ transaction generated is T2, . . . .

When the transaction manager generates a transaction, the first storage system executes the transaction. Transactions in the first storage system include a transaction whose execution has been completed and a transaction that is being executed.

For example, assuming that N=6, six rows of data are cached in the cache space corresponding to Table1, and the six rows of data are (Name 3, 25), (Name 4, 22), (Name 5, 25), (Name 6, 27), (Name 7, 24), and (Name 8, 30), the first storage system forms the six rows of data into a first row group shown in Table 3. The transaction manager in the first storage system generates the first transaction for the first row group, where the first transaction is a transaction whose transaction number is T3. The first storage system executes the first transaction, that is, the first storage system starts to store the first row group.

TABLE 3

| Name (name) | Age (age) |
|---|---|
| Name 3 | 25 |
| Name 4 | 22 |
| Name 5 | 25 |
| Name 6 | 27 |
| Name 7 | 24 |
| Name 8 | 30 |

Because the transaction manager allocates the transaction number to each generated transaction in ascending order of transaction numbers, transactions whose execution has been completed by the first storage system can be determined based on transaction numbers of transactions that are being executed by the first storage system.

For example, the first storage system is executing a $4^{th}$ transaction corresponding to a transaction number T3, a $6^{th}$ transaction corresponding to a transaction number T5, and a $7^{th}$ transaction corresponding to a transaction number T6. Based on the transaction numbers T3, T5, and T6 of the transactions that are being executed, it is determined that the transactions whose execution has been completed by the first storage system include the $1^{st}$ transaction corresponding to the transaction number T0, the $2^{nd}$ transaction corresponding to the transaction number T1, the $3^{rd}$ transaction corresponding to the transaction number T2, and a $5^{th}$ transaction corresponding to a transaction number T4.

Step 702: The first storage system compresses the first row group into a plurality of data segments, where the plurality of data segments are in one-to-one correspondence with a plurality of columns included in the first row group; and stores the plurality of data segments.

In step 702, the plurality of data segments are stored, that is, the first row group is stored.

In some embodiments, each row of data in the first row group is data of a same service, that is, each row of data in the first row group is data in a data table corresponding to the service. The plurality of data segments include a first data segment. For a column corresponding to the first data segment, the first data segment is used to store data included in the column in the first row group.

For the data table corresponding to the service, each of columns in the data table corresponds to one file, and the columns correspond to different files. For any column in the data table, a file corresponding to the column is used to store data included in the column in the data table. In step 702, for the data included in the column in the first row group, the first storage system compresses the data included in the column in the first row group into one data segment, and stores the data segment in the file corresponding to the column.

Figure 8:
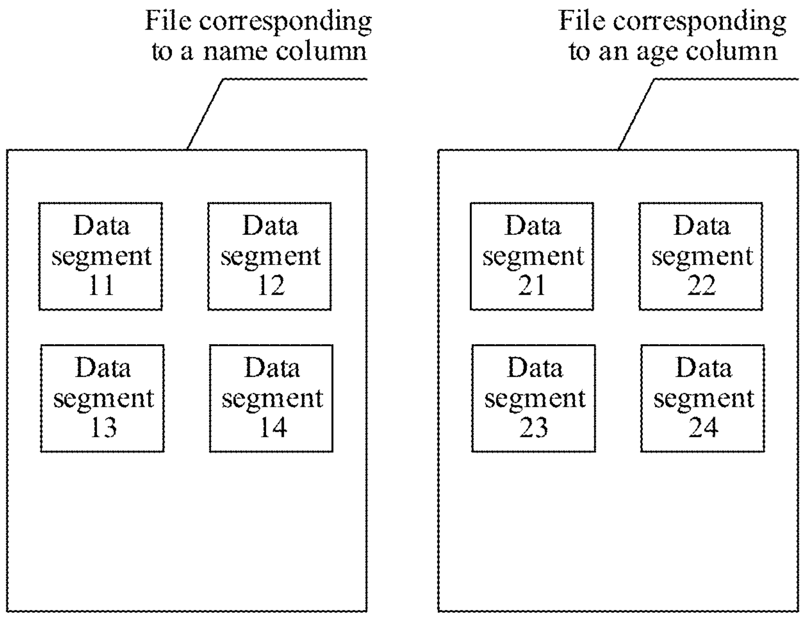
FIG. 8 is a diagram of a file according to an embodiment of this application.

For example, refer to FIG. 8, for the data table shown in Table 3, the first storage system includes a first file corresponding to a name column and a second file corresponding to an age column. The first storage system compresses data (Name 3, Name 4, Name 5, Name 6, Name 7, and Name 8) included in the name column in the first row group shown in Table 3 into one data segment 14, stores the data segment 14 in the first file corresponding to the name column, compresses data (25, 22, 25, 27, 24, and 30) included in the age column in the first row group shown in Table 3 into one data segment 24, and stores the data segment 24 in the second file corresponding to the age column.

Step 703: The first storage system generates a plurality of pieces of columnstore description information, where the plurality of pieces of columnstore description information are in one-to-one correspondence with the plurality of columns in the first row group, and columnstore description information corresponding to any column is used to describe the data included in the column in the first row group; and stores the plurality of pieces of columnstore description information.

Because the columnstore description information corresponding to any column is used to describe the data included in the column in the first row group, and the plurality of pieces of columnstore description information are used to describe the first row group, the first storage system may restore the first row group based on the plurality of pieces of columnstore description information.

In some embodiments, for the data table corresponding to the service, the first storage system includes a description information list corresponding to the data table. In step 703, the first storage system stores the plurality of pieces of columnstore description information in the description information list corresponding to the data table.

In some embodiments, the plurality of pieces of columnstore description information include first columnstore description information, and the first columnstore description information includes a group identifier of the first row group, transaction information of the first transaction, and a storage location of the first data segment. The first data segment is used to store a column of data corresponding to the first columnstore description information. Optionally, the storage location of the first data segment includes a column identifier of a column corresponding to the first columnstore description information and an offset of the first data segment in a file corresponding to the column.

In some embodiments, the first data segment is a data segment obtained by compressing the column of data corresponding to the first columnstore description information.

In some embodiments, the first columnstore description information further includes statistics information of the column of data, and the statistics information includes a maximum value and/or a minimum value of the column of data, and the like.

The statistics information of the column of data is used to accelerate a data query rate of the first storage system. For example, when the first storage system needs to query, in the data table, a row in which the column of data is equal to specified data, the first storage system determines whether the specified data is within a data range formed by the minimum value and the maximum value; and if the specified data is within the data range, queries, in the first row group, a row in which the column of data is equal to the specified data; or if the specified data is not within the data range, skips the first row group and queries a row group other than the first row group in the data table.

In some embodiments, the first storage system further generates first status description information, where the first status description information includes the group identifier of the first row group, the transaction information of the first transaction, and row status information, and the row status information indicates a status of each row of data in the first row group. The first storage system stores the first status description information in the description information list corresponding to the data table.

In some embodiments, the row status information indicates undeleted data and/or deleted data in the first row group.

In some embodiments, the row status information is a bitmap, the bitmap includes N bits, the N bits in the bitmap are in one-to-one correspondence with the N rows of data in the first row group, and any bit in the bitmap indicates whether a row of data corresponding to the bit is deleted.

Refer to a description information list shown in Table 4, Table 4 is the description information list corresponding to the data table "Table1" shown in Table 1 or Table 2. For example, for the first row group shown in Table 3, the first storage system stores, in a file corresponding to the name column, the data segment 14 corresponding to the name column in the first row group; obtains an offset "12" of the data segment 14 in the file corresponding to the name column; generates columnstore description information used to describe the name column, where the columnstore description information includes the group identifier "G3" of the first row group, the transaction information "T3" of the first transaction, and a storage location of the data segment 14, and the storage location includes a column identifier "Name" of the name column and the offset "12" of the data segment 14; and stores the columnstore description information in the description information list shown in Table 4, where the columnstore description information is a record with a sequence number 10 in Table 3.

The first storage system stores, in a file corresponding to the age column, the data segment 24 corresponding to the age column in the first row group; obtains an offset "10" of the data segment 24 in the file corresponding to the age column; generates columnstore description information used to describe the age column, where the columnstore description information includes the group identifier "G3" of the first row group, the transaction information "T3" of the first transaction, and a storage location of the data segment 24, and the storage location includes a column identifier "Age" of the age column and the offset "10" of the data segment 24; and stores the columnstore description information in the description information list shown in Table 4, where the columnstore description information is a record with a sequence number 11 in Table 4.

The first storage system further stores the first status description information in the description information list shown in Table 4, where the first status description information is a record with a sequence number 12 in Table 3, and the first status description information includes the group identifier "G3" of the first row group, the transaction information "T3" of the first transaction, and the row status information "000000". Optionally, the first status description information further includes indication information (for example, "−1" in Table 4 is the indication information), and the indication information indicates that description information including the indication information is the first status description information.

TABLE 4

| | | | Storage location | | |
|---|---|---|---|---|---|
| Sequence number | Group identifier | Transaction information | Column identifier | Offset | Row status information |
| 1 | G0 | T0 | Name | 0 | Null |
| 2 | G0 | T0 | Age | 0 | Null |
| 3 | G0 | T0 | −1 | Null | 000000 |
| 4 | G1 | T1 | Name | 5 | Null |
| 5 | G1 | T1 | Age | 4 | Null |
| 6 | G1 | T1 | −1 | Null | 000000 |
| 7 | G2 | T2 | Name | 8 | Null |
| 8 | G2 | T2 | Age | 6 | Null |
| 9 | G2 | T2 | −1 | Null | 000000 |
| 10 | G3 | T3 | Name | 12 | Null |
| 11 | G3 | T3 | Age | 10 | Null |
| 12 | G3 | T3 | −1 | Null | 000000 |
| . . . | . . . | . . . | . . . | . . . | Null |

In some embodiments, the first storage system further records the group identifier of the first row group.

Each time the first storage system needs to store one row group, the first storage system repeatedly performs the foregoing process of steps 701 to 703, to store the row group.

Refer to FIG. 9, an embodiment of this application provides a data storage method 900. The method 900 is applied to the system 100 shown in FIG. 1, FIG. 2, FIG. 3, FIG. 4, FIG. 5, or FIG. 6. In the method 900, a first storage system compresses a row group that needs to be stored into one data segment, and stores the data segment. The method 900 includes a procedure of steps 901 to 903.

Step 901: This step is the same as step 701 in the embodiment shown in FIG. 7, and details are not described herein again.

Step 902: The first storage system compresses the first row group into one data segment, and stores the data segment.

In step 902, the data segment is stored, that is, the first row group is stored.

In some embodiments, each row of data in the first row group is data of a same service, that is, each row of data in the first row group is data in a data table corresponding to the service. The data table corresponding to the service corresponds to one file. After compressing the first row group into one data segment, the first storage system stores the data segment in the file.

Figure 10:
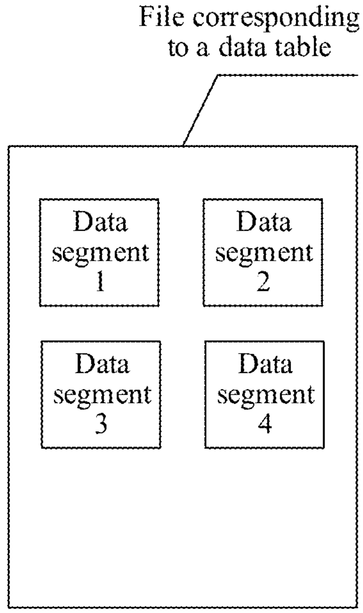
FIG. 10 is a diagram of another file according to an embodiment of this application.

For example, refer to FIG. 10, for the first row group shown in Table 3, the first storage system compresses the six rows of data in the first row group shown in Table 3 into one data segment 4, and stores the data segment 4 in the file corresponding to the data table Table1. It is assumed that an offset of the data segment 4 in the file is “12”.

Step 903: The first storage system generates row group description information, where the row group description information is used to describe the first row group; and stores the row group description information.

Because the row group description information is used to describe the first row group, the first storage system may restore the first row group based on the row group description information.

In some embodiments, for the data table corresponding to the service, the first storage system includes a description information list corresponding to the data table, and the first storage system stores the row group description information in the description information list.

In some embodiments, the row group description information includes a group identifier of the first row group, transaction information of a first transaction, and a storage location of the data segment corresponding to the first row group. The storage location of the data segment corresponding to the first row group includes an offset of the data segment in the file corresponding to the data table.

In some embodiments, the row group description information further includes statistics information of each column of data in the first row group. Optionally, for any column in the first row group, the statistics information of the column of data includes a maximum value and/or a minimum value of the column of data, and the like.

In some embodiments, the first storage system further generates first status description information, where the first status description information includes the group identifier of the first row group, the transaction information of the first transaction, and row status information, and the row status information indicates a status of each row of data in the first row group. The first storage system stores the first status description information in the description information list corresponding to the data table.

In some embodiments, the row status information indicates undeleted data in the first row group. Optionally, the row status information further indicates deleted data in the first row group.

Refer to a description information list shown in Table 5, it is assumed that the group identifier of the first row group shown in Table 3 is “G3”, the transaction information of the first transaction includes the transaction number “T3”, the offset of the data segment 4 corresponding to the first row group is “12”, and the first row group includes the six rows of data. The first storage system generates the row group description information, where the row group description information includes the group identifier “G3” of the first row group, the transaction information “T3” of the first transaction, and the storage location “12”; and stores the row group description information in the description information list shown in Table 5. Refer to a record with a sequence number 7 in Table 5. The first storage system further generates the first status description information, where the first status description information includes the group identifier “G3” of the first row group, the transaction information “T3” of the first transaction, and the row status information “000000”, the row status information “000000” indicates that the six rows of data in the first row group are not deleted, and the first status description information is stored in the description information list shown in Table 5. Refer to a record with a sequence number 8 in Table 5. Optionally, the first status description information further includes indication information (for example, “−1” in Table 5 is the indication information), and the indication information indicates that description information including the indication information is the first status description information.

TABLE 5

| Sequence number | Group identifier | Transaction information | Storage location | Row status information |
|---|---|---|---|---|
| 1 | G0 | T0 | 0 | Null |
| 2 | G0 | T0 | −1 | 000000 |
| 3 | G1 | T1 | 5 | Null |
| 4 | G1 | T1 | −1 | 000000 |
| 5 | G2 | T2 | 8 | Null |
| 6 | G2 | T2 | −1 | 000000 |
| 7 | G3 | T3 | 12 | Null |
| 8 | G3 | T3 | −1 | 000000 |
| . . . | . . . | . . . | . . . | . . . |

In some embodiments, the first storage system further records the group identifier of the first row group.

Each time the first storage system needs to store one row group, the first storage system repeatedly performs the foregoing process of steps 901 to 903, to store the row group.

Figure 11:
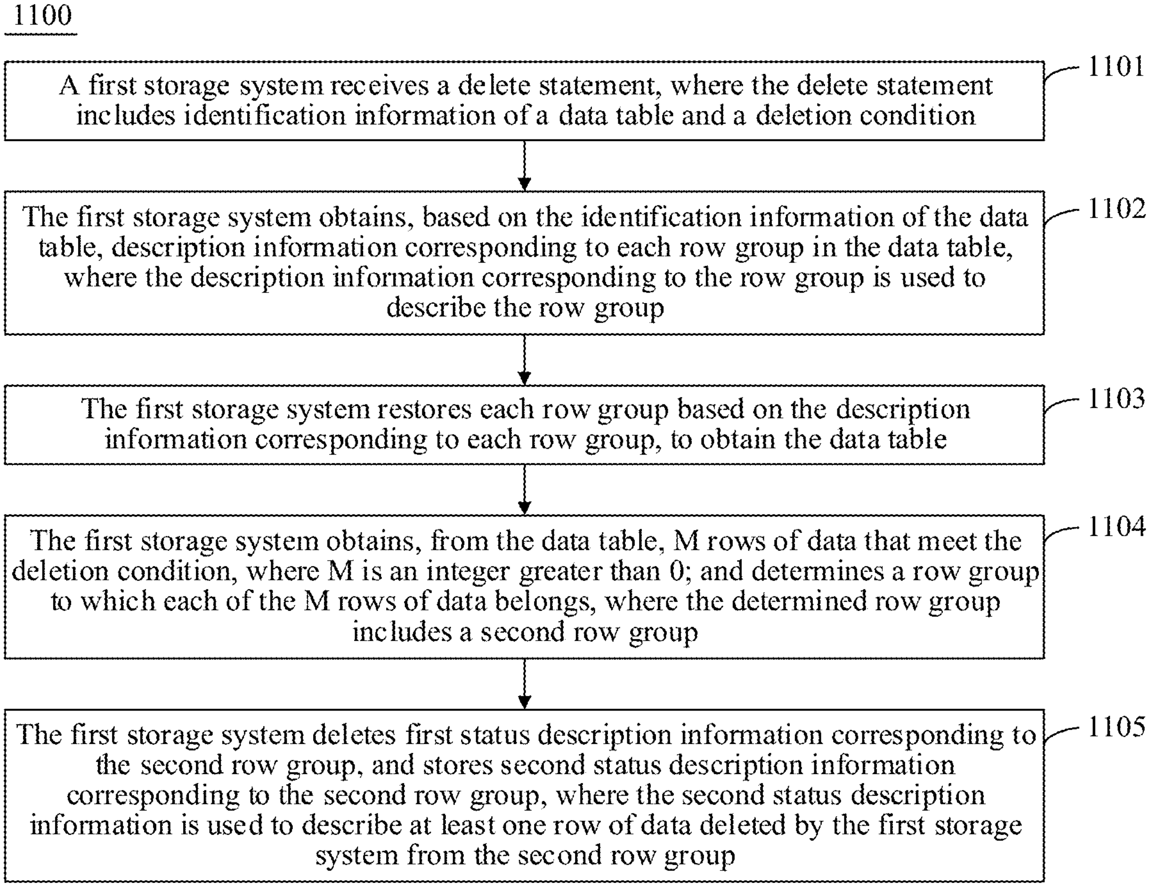
FIG. 11 is a flowchart of a data deletion method according to an embodiment of this application.

Refer to FIG. 11, an embodiment of this application provides a data deletion method 1100. The method 1100 is applied to the system 100 shown in FIG. 1, FIG. 2, FIG. 3, FIG. 4, FIG. 5, or FIG. 6. A first storage system in the system 100 deletes data by using the method 1100. The method 1100 includes a procedure of steps 1101 to 1105.

Step 1101: The first storage system receives a delete statement, where the delete statement includes identification information of a data table and a deletion condition.

In some embodiments, the deletion condition includes a column identifier of at least one column in the data table and specified data corresponding to each column, and the deletion condition indicates at least one row of data that needs to be deleted from the data table.

For example, the first storage system receives the following delete statement, where the delete statement includes the identification information “Table1” of the data table and the deletion condition “Name=Name 1”, and the deletion condition includes a column identifier “Name” of a name column and specified data “Name 1” corresponding to the name column. The delete statement is as follows:

Delete Form Table1
Where Name=Name 1.

In some embodiments, after receiving the delete statement, the first storage system generates a second transaction, and executes the second transaction, where the second transaction indicates time for deleting the at least one row of data.

The first storage system may delete the data when receiving an update statement in addition to receiving the delete statement. The update statement includes the identification information of the data table and the deletion condition.

For example, the first storage system receives the following update statement:

Update Table1
Set Age=21
Where Name=Name 1.

The update statement includes the identification information "Table1" of the data table and the deletion condition "Name=Name 1". The update statement further indicates a row of data that needs to be stored in the data table "Table1", and the row of data is a row of data including Name 1 and Age "21". In addition, the update statement further indicates that at least one row of data including Name 1 needs to be deleted from the data table "Table1".

In some embodiments, after receiving the update statement, the first storage system generates a second transaction, and executes the second transaction, where the second transaction indicates time for deleting the at least one row of data indicated by the deletion condition.

Step 1102: The first storage system obtains, based on the identification information of the data table, description information corresponding to each row group in the data table, where the description information corresponding to the row group is used to describe the row group.

The first storage system stores a row group in the following two storage manners. In the first storage manner, the first storage system compresses the row group into a plurality of data segments and stores the plurality of data segments. In the second storage manner, the first storage system compresses the row group into one data segment and stores the data segment.

In the first storage manner, the first storage system compresses a row group into a plurality of data segments, where the plurality of data segments are in one-to-one correspondence with a plurality of columns in the row group, and description information corresponding to the row group includes a plurality of pieces of columnstore description information corresponding to the row group and first status description information corresponding to the row group. In step 1102, the first storage system obtains, based on the identification information of the data table, a description information list corresponding to the data table, and obtains a plurality of pieces of columnstore description information and first status description information that correspond to each row group and that are stored in the description information list.

The plurality of pieces of columnstore description information and the first status description information that correspond to a same row group each include a group identifier of the row group. For example, refer to the description information list corresponding to the data table "Table1" shown in Table 4, two pieces of columnstore description information (two records with sequence numbers 1 and 2 in Table 4) and first status description information (one record with a sequence number 3 in Table 4) that include the group identifier "G0" and two pieces of columnstore description information (two records with sequence numbers 4 and 5 in Table 4) and first status description information (one record with a sequence number 6 in Table 4) that include the group identifier "G1" are obtained from the description information list. The foregoing obtaining operation is repeated to obtain the plurality of pieces of columnstore description information and the first status description information that correspond to each row group in the data table "Table1"

In the second storage manner, the first storage system compresses a row group into one data segment, where description information corresponding to the row group includes row group description information corresponding to the row group and first status description information corresponding to the row group. In step 1102, the first storage system obtains, based on the identification information of the data table, a description information list corresponding to the data table, and obtains row group description information and first status description information that correspond to each row group and that are stored in the description information list.

The row group description information and the first status description information that correspond to a same row group each include a group identifier of the row group. For example, refer to the description information list corresponding to the data table "Table1" shown in Table 5, row group description information (one record with a sequence number 1 in Table 5) and first status description information (one record with a sequence number 2 in Table 5) that include the group identifier "G0" and row group description information (one record with a sequence number 3 in Table 5) and first status description information (one record with a sequence number 4 in Table 5) that include the group identifier "G1" are obtained from the description information list. The foregoing obtaining operation is repeated to obtain the row group description information and the first status description information that correspond to each row group in the data table "Table1".

Step 1103: The first storage system restores each row group based on the description information corresponding to each row group, to obtain the data table.

In step 1103, the first storage system restores any row group based on description information corresponding to the row group. When each row group is restored, each row group is combined into the data table.

In some embodiments, for any row group in the data table, the first storage system restores the row group by performing the following operations 11031 and 11032.

11031: The first storage system obtains, based on the description information corresponding to the row group, at least one data segment corresponding to the row group.

In the foregoing first storage manner, the description information corresponding to the row group includes the plurality of pieces of columnstore description information corresponding to the row group, the plurality of pieces of columnstore description information are in one-to-one correspondence with the plurality of columns in the row group, and each column in the data table corresponds to one file. For any column in the row group, columnstore description information corresponding to the column includes a storage location of a data segment corresponding to the column, and the storage location includes a column identifier of the column and an offset of the data segment. Optionally, an operation of obtaining the data segment corresponding to the column is:

obtaining, based on the identification information of the data table, the file corresponding to each column in the data table; determining, based on the column identifier of the column, the offset in the file corresponding to the column; and obtaining, based on the offset, the data segment corresponding to the column from the file corresponding to the column. The data segment corresponding to each column in the row group is obtained in this manner.

In the foregoing second storage manner, the description information corresponding to the row group includes the row group description information corresponding to the row group, the row group description information includes a storage location of a data segment corresponding to the row group, and the storage location includes an offset of the data segment. Optionally, an operation of obtaining the data segment corresponding to the row group is: obtaining, based on the identification information of the data table, the file corresponding to the data table, and obtaining, based on the offset, the data segment corresponding to the row group from the file corresponding to the data table.

11032: The first storage system decompresses the at least one data segment, and obtains, based on the row status information corresponding to the row group, each row of data in the row group from the at least one decompressed data segment.

The row status information corresponding to the row group indicates undeleted data and/or deleted data in the row group.

In the foregoing first storage manner, the description information corresponding to the row group includes the first status description information corresponding to the row group, the first status description information includes row status information corresponding to the row group, and each column in the row group corresponds to one data segment. The first storage system decompresses the data segment corresponding to each column, and obtains, based on the row status information, undeleted data in the row group from the decompressed data segment corresponding to each column, to obtain the row group.

In the foregoing second storage manner, the description information corresponding to the row group includes first status description information corresponding to the row group, the first status description information includes row status information corresponding to the row group, and the row group corresponds to one data segment. The first storage system decompresses the data segment, and obtains, based on the row status information, undeleted data in the row group from the decompressed data segment corresponding to the row group, to obtain the row group.

Step 1104: The first storage system obtains, from the data table, M rows of data that meet the deletion condition, where M is an integer greater than 0; and determines a row group to which each of the M rows of data belongs, where the determined row group includes a second row group.

The determined row group may include one or more row groups, that is, the determined row group may include another row group in addition to the second row group.

The deletion condition includes a column identifier of a column and specified data corresponding to the column. The first storage system queries, based on the column identifier, the data table for the M rows of data that are the specified data in the column, where the M rows of data are data that needs to be deleted; and determines the row group to which each of the M rows of data belongs, where the second row group includes at least one row of data that needs to be deleted.

Step 1105: The first storage system deletes first status description information corresponding to the second row group, and stores second status description information corresponding to the second row group, where the second status description information is used to describe the at least one row of data deleted by the first storage system from the second row group.

If the determined row group further includes the another row group, the first storage system deletes first status description information corresponding to the another row group, and stores second status description information corresponding to the another row group.

In some embodiments, third description information corresponding to the second row group includes a group identifier of the second row group, transaction information of the second transaction, and row status information, and the row status information is used to describe the at least one row of data deleted from the second row group. The row status information is further used to describe undeleted data in the second row group.

In some embodiments, the first storage system deletes, from the description information list, the first status description information corresponding to the second row group, and stores, in the description information list, the second status description information corresponding to the second row group.

For example, it is assumed that the group identifier of the second row group is "G1", and it is assumed that the first storage system 101 needs to delete $2^{nd}$ row of data and $3^{rd}$ row of data from the second row group.

In the foregoing first storage manner, the first storage system includes the description information list shown in Table 4, and the record with the sequence number 6 in Table 4 is the first status description information corresponding to the second row group. The first storage system deletes, from the description information list shown in Table 4, the first status description information corresponding to the second row group, and stores, in the description information list shown in Table 4, the second status description information corresponding to the second row group. Refer to a record with a sequence number 12 shown in Table 6. The record is the second status description information corresponding to the second row group, the second status description information includes a group identifier "G1" of the second row group, transaction information "T4" of the second transaction, and row status information "011000", and the row status information "011000" indicates to delete the $2^{nd}$ row of data and the $3^{rd}$ row of data from the second row group.

TABLE 6

| Sequence number | Group identifier | Transaction information | Storage location: Column identifier | Storage location: Offset | Row status information |
|---|---|---|---|---|---|
| 1 | G0 | T0 | Name | 0 | Null |
| 2 | G0 | T0 | Age | 0 | Null |
| 3 | G0 | T0 | −1 | Null | 000000 |
| 4 | G1 | T1 | Name | 5 | Null |
| 5 | G1 | T1 | Age | 4 | Null |
| 6 | G2 | T2 | Name | 8 | Null |
| 7 | G2 | T2 | Age | 6 | Null |
| 8 | G2 | T2 | −1 | Null | 000000 |
| 9 | G3 | T3 | Name | 12 | Null |
| 10 | G3 | T3 | Age | 10 | Null |
| 11 | G3 | T3 | −1 | Null | 000000 |
| 12 | G1 | T4 | −1 | Null | 011000 |
| . . . | . . . | . . . | . . . | . . . | Null |

In the foregoing second storage manner, the first storage system includes the description information list shown in Table 5, and the record with the sequence number 4 in Table 5 is the first status description information of the second row group. The first storage system deletes, from the description information list shown in Table 5, the first status description information corresponding to the second row group, and stores, in the description information list shown in Table 5, the second status description information corresponding to the second row group. Refer to a record with a sequence number 8 shown in Table 7. The record is the second status description information corresponding to the second row group, the second status description information includes a group identifier "G1" of the second row group, transaction information "T4" of the second transaction, and row status information "011000", and the row status information "011000" indicates to delete the 2nd row of data and the 3rd row of data from the second row group.

TABLE 7

| Sequence number | Group identifier | Transaction information | Storage location | Row status information |
|---|---|---|---|---|
| 1 | G0 | T0 | 0 | Null |
| 2 | G0 | T0 | −1 | 000000 |
| 3 | G1 | T1 | 5 | Null |
| 4 | G2 | T2 | 8 | Null |
| 5 | G2 | T2 | −1 | 000000 |
| 6 | G3 | T3 | 12 | Null |
| 7 | G3 | T3 | −1 | 000000 |
| 8 | G1 | T4 | −1 | 011000 |
| . . . | . . . | . . . | . . . | . . . |

In some embodiments, the first storage system further records the group identifier of the second row group.

In the foregoing first storage manner, the second row group corresponds to a plurality of data segments, and the plurality of data segments still store the at least one row of data that needs to be deleted in the second row group. The first storage system may delete the at least one row of data from the plurality of data segments, so as to save storage space; or the first storage system may not delete the at least one row of data from the plurality of data segments.

When the at least one row of data is deleted from the plurality of data segments, for any data segment, the first storage system deletes, from the data segment, data belonging to the at least one row.

In the foregoing second storage manner, the second row group corresponds to one data segment, and the data segment still stores the at least one row of data that needs to be deleted in the second row group. The first storage system may delete the at least one row of data from the data segment, so as to save storage space; or the first storage system may not delete the at least one row of data from the data segment.

The first storage system stores a row group by using the method 700 shown in FIG. 7 or the method 900 shown in FIG. 9, and deletes at least one row of data in the row group by using the method 1100 shown in FIG. 11. To enable a second storage system to back up the first storage system, data in the first storage system may be periodically managed. To be specific, for any period, data stored by the first storage system in the periodicity is stored in the second storage system, and data deleted in the first storage system in the periodicity is also deleted from the second storage system, so that data stored in the first storage system is consistent with data stored in the second storage system. For a specific data management process, refer to implementation of any one of the following embodiments.

Figure 12:
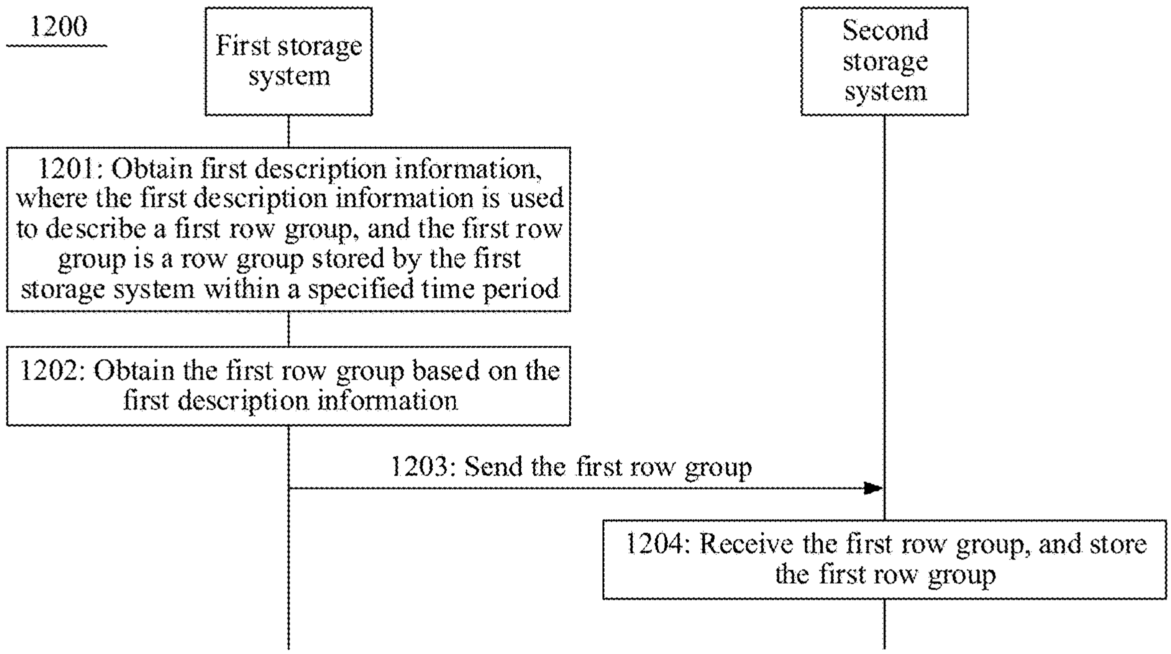
FIG. 12 is a flowchart of a data management method according to an embodiment of this application.

Refer to FIG. 12, an embodiment of this application provides a data management method 1200. The method 1200 is applied to the system 100 shown in FIG. 1, FIG. 3, or FIG. 5. In the method 1200, a first storage system stores, in a second storage system, data that is stored by the first storage system within a specified time period. The method 1200 includes steps 1201 to 1204.

Step 1201: The first storage system obtains first description information, where the first description information is used to describe a first row group, the first row group is a row group stored by the first storage system within a specified time period, and the first row group includes at least one row of data.

In some embodiments, the first storage system includes a first scheduling tool, and the first storage system obtains the first description information by using the first scheduling tool.

The first storage system may further obtain third description information, where the third description information is used to describe at least one row of data deleted by the first storage system from a second row group, and both the first storage system and the second storage system store the second row group.

The first description information is columnstore description information stored by the first storage system within the specified time period. Alternatively, the first description information is row group description information stored by the first storage system within the specified time period.

In some embodiments, the first storage system may further obtain status description information stored by the first storage system within the specified time period. The status description information includes first status description information corresponding to the first row group and/or second status description information corresponding to the second row group. The first storage system deletes the at least one row of data from the second row group within the specified time period, the second status description information corresponding to the second row group is used to describe the at least one row of data deleted from the second row group, and the third description information includes the second status description information corresponding to the second row group.

In some embodiments, the first storage system periodically obtains a row group stored in the first storage system, and stores the obtained row group in the second storage system. The specified time period is a periodicity. For example, the specified time period is a current periodicity.

In step 1201, the first storage system obtains content such as the first description information and the third description information by performing the following operations 12011 to 12013.

12011: The first storage system obtains a first transaction set, where the first transaction set includes a transaction that is being executed by the first storage system at an end moment of the specified time period.

In 12011, at the end moment of the specified time period, the first storage system takes a snapshot of the transaction that is being executed, to obtain the first transaction set, where the first transaction set includes transaction information of the transaction that is being executed by the first storage system at the end moment of the specified time period.

In some embodiments, the transaction information of the transaction includes a transaction number and the like of the transaction.

The first storage system takes a snapshot of the transaction that is being executed by the first storage system at the end moment of the specified time period, to obtain the first transaction set.

The first transaction set is used to reflect a transaction whose execution has been completed by the first storage system before the end moment of the specified time period.

For example, a transaction manager of the first storage system sequentially generates a 1st transaction corresponding to a transaction number T0, a 2nd transaction corresponding to a transaction number T1, a 3rd transaction corresponding to a transaction number T2, a 4th transaction corresponding to a transaction number T3, . . . . It is assumed that the first transaction set includes a 7th transaction corresponding to a transaction number T6, a 9th transaction corresponding to a transaction number T8, and a $10^{th}$ transaction corresponding to a transaction number T9. It may be determined, based on the first transaction set, that transactions whose execution has been completed by the first storage system before the end moment of the specified time period include the $1^{st}$ to the $6^{th}$ transactions and the $8^{th}$ transaction.

In some embodiments, the specified time period is a periodicity in addition to a $1^{st}$ periodicity, that is, the specified time period is a $2^{nd}$ periodicity, a $3^{rd}$ periodicity, a $4^{th}$ periodicity, . . . . The first storage system further obtains a second transaction set, where the second transaction set includes a transaction that is being executed by the first storage system at a start moment of the specified time period.

In some embodiments, the first storage system obtains and stores the second transaction set at the start moment of the specified time period. Optionally, the second transaction set is obtained by the first storage system at the start moment of the specified time period by taking a snapshot of the transaction that is being executed, where the second transaction set includes transaction information of the transaction that is being executed by the first storage system at the start moment of the specified time period.

The second transaction set is used to reflect a transaction whose execution has been completed by the first storage system before the start moment of the specified time period.

12012: The first storage system determines a target transaction based on the first transaction set, where the target transaction is a transaction whose execution has been completed by the first storage system within the specified time period.

In some embodiments, when the specified time period is the $1^{st}$ periodicity, the first storage system determines, based on the first transaction set, the target transaction whose execution has been completed by the first storage system within the specified time period.

In some embodiments, when the specified time period is the $2^{nd}$ periodicity, the $3^{rd}$ periodicity, . . . , the first storage system determines, based on the first transaction set and the second transaction set, the target transaction whose execution has been completed by the first storage system within the specified time period.

In 12012, the target transaction may be a first transaction, and the first transaction indicates time for storing the first row group by the first storage system; or the target transaction may be a second transaction, and the second transaction indicates time for deleting the at least one row of data from the second row group by the first storage system.

12013: The first storage system selects, from description information that has been generated by the first storage system, description information including transaction information of the target transaction.

In the foregoing first storage manner, the first storage system selects, from the description information that has been generated by the first storage system, the description information including the transaction information of the target transaction; and if the selected description information includes a plurality of pieces of columnstore description information and status description information, determines that the target transaction is the first transaction, where the first description information includes the plurality of pieces of columnstore description information; or if the selected description information includes only status description information, determines that the target transaction is the second transaction, where the third description information includes the status description information, and the status description information is the second status description information that is stored by the first storage system when the first storage system deletes data from the second row group.

For example, refer to Table 6. Table 6 includes the description information that has been generated by the first storage system. It is assumed that the determined target transaction includes the $4^{th}$ transaction corresponding to the transaction number T3 and the $5^{th}$ transaction corresponding to the transaction number T4.

The first storage system selects, from the description information list shown in Table 6, description information including the transaction number T3. The selected description information includes two pieces of columnstore description information (for example, two records with the sequence numbers 9 and 10 in Table 6) and one piece of status description information (for example, one record with the sequence number 11 in Table 6). Therefore, the $4^{th}$ transaction corresponding to the transaction number T3 is the first transaction and indicates the time for storing the first row group, and the first description information includes the two pieces of columnstore description information.

The first storage system selects, from the description information list shown in Table 6, description information including the transaction number T4. The selected description information includes one piece of status description information (for example, one record with the sequence number 12 in Table 6). Therefore, the $5^{th}$ transaction corresponding to the transaction number T4 is the second transaction and indicates the time for deleting the at least one row of data from the second row group, and the third description information includes the status description information.

In the foregoing second storage manner, the first storage system selects, from the description information that has been generated by the first storage system, the description information including the transaction information of the target transaction; and if the selected description information includes one piece of row group description information and status description information, determines that the target transaction is the first transaction, where the first description information includes the row group description information; or if the selected description information includes only status description information, determines that the target transaction is the second transaction, where the third description information includes the status description information, the status description information is the second status description information that is stored by the first storage system when the first storage system deletes data from the second row group, and the third description information includes the status description information.

For example, refer to Table 7. Table 7 includes the description information that has been generated by the first storage system. It is assumed that the determined target transaction includes the $4^{th}$ transaction corresponding to the transaction number T3 and the $5^{th}$ transaction corresponding to the transaction number T4.

The first storage system selects, from the description information list shown in Table 7, description information including the transaction number T3. The selected description information includes one piece of row group description information (for example, one record with the sequence number 6 in Table 7) and one piece of status description information (for example, one record with the sequence number 7 in Table 7). Therefore, the $5^{th}$ transaction corresponding to the transaction number T4 is the first transaction and indicates the time for storing the first row group, and the first description information includes the piece of row group description information.

The first storage system selects, from the description information list shown in Table 7, description information including the transaction number T4. The selected description information includes one piece of status description information (for example, one record with the sequence number 8 in Table 7). Therefore, the 5th transaction corresponding to the transaction number T4 is the second transaction and indicates the time for deleting the at least one row of data from the second row group, and the third description information includes the status description information.

In some embodiments, the first storage system selects, based on a row group range, at least one piece of description information from the description information that has been generated by the first storage system, where the row group range includes a row group operated by the first storage system within the specified time period, and a row group corresponding to a group identifier included in each piece of description information in the at least one piece of description information belongs to the row group range; and selects, from the at least one piece of description information, the description information including the transaction information of the target transaction.

In some embodiments, when the first storage system operates a row group, the first storage system records a group identifier of the row group. For example, when the first storage system stores one row group, the first storage system records a group identifier of the row group; or when the first storage system deletes one or more rows of data from a row group, the first storage system records a group identifier of the row group. Therefore, the row group range includes a group identifier of a row group recorded by the first storage system within the specified time period.

In some embodiments, the first storage system includes a description information list, and the description information list includes the description information that has been generated by the first storage system.

For the foregoing operations 12012 and 12013, the following lists an implementation instance of implementing the operations 12012 and 12013. The implementation instance is implemented by performing the following operations (1) to (4).

(1): The first storage system starts scanning from 1st piece of description information in the description information list, and performs the following operation (2) each time one piece of description information is obtained through scanning.

In some embodiments, when obtaining one piece of description information through scanning, the first storage system performs the following operation (2) when a row group corresponding to a group identifier included in the description information is a row group in the row group range; or scans a next piece of scanning information in the description information list when a row group corresponding to a group identifier included in the description information is not a row group in the row group range.

(2): The first storage system determines a transaction corresponding to transaction information included in the description information, and determines, based on the first transaction set, whether the transaction is a transaction whose execution has been completed by the first storage system within the specified time period.

When the specified time period is the 1st periodicity, the first storage system determines, based on the first transaction set, whether the transaction is a transaction whose execution has been completed by the first storage system within the specified time period. When the specified time period is the 2nd periodicity, the 3rd periodicity, . . . , the first storage system determines, based on the first transaction set and the second transaction set, whether the transaction is a transaction whose execution has been completed by the first storage system within the specified time period.

(3): If the transaction is a target transaction whose execution has been completed by the first storage system within the specified time period, the first storage system selects the description information, where the description information includes description information stored by the first storage system within the specified time period.

If the description information includes indication information, the indication information indicates that the description information is status description information, that is, the description information is the status description information. If the description information does not include the indication information, the description information is columnstore description information or row group description information.

(4): The first storage system obtains, from the selected description information, Z pieces of description information including transaction information of a same target transaction, where Z is an integer greater than 0.

In the foregoing first storage manner, if the Z pieces of description information include a plurality of pieces of columnstore description information and one piece of status description information, the first description information includes the plurality of pieces of columnstore description information; and if the Z pieces of description information include one piece of status description information, the third description information includes the piece of status description information.

In the foregoing second storage manner, if the Z pieces of description information include one piece of row group description information and one piece of status description information, the first description information includes the piece of row group description information; and if the Z pieces of description information include one piece of status description information, the third description information includes the piece of status description information.

It should be noted that, for the first row group stored by the first storage system within the specified time period, the description information obtained by the first storage system includes the first description information corresponding to the first row group and the status description information corresponding to the first row group; and for the at least one row of data deleted by the first storage system from the second row group within the specified time period, the description information obtained by the first storage system includes the third description information corresponding to the second row group.

Step 1202: The first storage system obtains the first row group based on the first description information.

In the foregoing first storage manner, the first description information includes a plurality of pieces of columnstore description information of the first row group, and the plurality of pieces of columnstore description information are in one-to-one correspondence with a plurality of columns in the first row group. In step 1202, the first storage system obtains the first row group in Case 1 or Case 2.

Case 1: The first storage system and the second storage system are systems of a same type, and a data storage manner used by the first storage system is the same as a data storage manner used by the second storage system. For example, the first storage system stores data in a columnstore manner, and the second storage system also stores data in the columnstore manner. In Case 1, the first row group obtained by the first storage system is a plurality of data segments corresponding to the first row group.

In some embodiments, for one piece of columnstore description information corresponding to any column, the columnstore description information includes a group identifier of the first row group and a storage location of a data segment corresponding to the column, and the storage location includes a column identifier of the column and an offset of the data segment in a file corresponding to the column. The first storage system obtains, from the first storage system based on the column identifier, the file corresponding to the column, and obtains, from the file based on the offset, the data segment corresponding to the column. A data segment corresponding to each column in the first row group is obtained in the foregoing manner.

Case 2: The first storage system and the second storage system may be systems of a same type or may be systems of different types, and the first storage system obtains each row of data in the first row group.

In some embodiments, for one piece of columnstore description information corresponding to any column, the columnstore description information includes a group identifier of the first row group and a storage location of a data segment corresponding to the column, and the storage location includes a column identifier of the column and an offset of the data segment in a file corresponding to the column. In step 1201, the first storage system further obtains status description information corresponding to the first row group, where the status description information includes row status information, and the row status information indicates undeleted data and/or deleted data in the first row group. The first storage system obtains, from the first storage system based on the column identifier, the file corresponding to the column, and obtains, from the file based on the offset, the data segment corresponding to the column. A data segment corresponding to each column in the first row group is obtained in the foregoing manner. The first storage system restores each row of data in the first row group based on the row status information and the data segment corresponding to each column in the first row group.

In the foregoing second storage manner, the first description information includes row group description information of the first row group. In step 1202, the first storage system obtains the first row group in Case 1 or Case 2.

Case 1: The first storage system and the second storage system are systems of a same type, and the first row group obtained by the first storage system is one data segment corresponding to the first row group.

In some embodiments, the row group description information includes a group identifier of the first row group and a storage location of a data segment corresponding to the first row group, and the storage location includes an offset of the data segment in a file corresponding to the data table. The first storage system obtains, from the first storage system, the file corresponding to the data table, and obtains, from the file based on the offset, the data segment corresponding to the first row group.

Case 2: The first storage system and the second storage system may be systems of a same type or may be systems of different types, and the first storage system obtains each row of data in the first row group.

In some embodiments, the row group description information includes a group identifier of the first row group and a storage location of a data segment corresponding to the first row group. In step 1201, the first storage system further obtains status description information corresponding to the first row group, where the status description information includes row status information, and the row status information indicates undeleted data and/or deleted data in the first row group. The first storage system obtains, from the first storage system, the file corresponding to the data table, and obtains, from the file based on the offset, the data segment corresponding to the first row group. Each row of data in the first row group is restored based on the row status information and the data segment corresponding to the first row group.

Step 1203: The first storage system sends the first row group to the second storage system.

For Case 1, the first storage system sends a file to the second storage system, where the file includes the data segment corresponding to the first row group or the plurality of data segments corresponding to the first row group.

In a case in which the first storage system obtains the plurality of data segments corresponding to the first row group, the first storage system sends the file to the second storage system, where the file includes the plurality of data segments, and the plurality of data segments are in one-to-one correspondence with a plurality of columns in the first row group. Optionally, the file further includes identification information of a data table, a group identifier of the first row group, a column identifier of each column in the first row group, the row status information, statistics information of each column of data in the first row group, and/or the like. Columnstore description information of any column includes statistics information of data in the column in the first row group, and the first storage system obtains the statistics information of the column of data from the columnstore description information.

In a case in which the first storage system obtains the data segment corresponding to the first row group, the first storage system sends the file to the second storage system, where the file includes the data segment. Optionally, the file further includes a group identifier of the first row group, row status information, statistics information of each column of data in the first row group, and/or the like. The row group description information corresponding to the first row group includes the statistics information of each column of data in the first row group, and the first storage system obtains the statistics information of each column of data from the row group description information.

If the first storage system further obtains the third description information, the first storage system sends the third description information and the identification information of the data table to the second storage system.

In some embodiments, the first storage system communicates with the second storage system by using a cloud, to be specific, the first storage system stores the file at a specified location in the cloud, and the second storage system obtains the file from the specified location in the cloud, so that the first storage system sends the first row group to the second storage system; and/or the first storage system stores the third description information and the identification information of the data table at the specified location in the cloud, and the second storage system obtains the third description information and the identification information of the data table from the specified location in the cloud, so that the first storage system sends the third description information and the identification information of the data table to the second storage system.

For Case 2, the first storage system sends an insert statement to the second storage system, where the insert statement includes the identification information of the data table and each row of data in the first row group.

In some embodiments, the first storage system generates an insert statement, where the insert statement includes the identification information of the data table and each row of data in the first row group; and sends the insert statement to the second storage system.

In Case 2, if the first storage system further obtains third description information, where the third description information includes a group identifier of the second row group and row status information, and the row status information indicates at least one row of data deleted from the second row group, the first storage system obtains a row identifier of each row of data in the at least one row of data based on the group identifier of the second row group and the row status information; and sends a delete statement to the second storage system, where the delete statement includes the identification information of the data table and the row identifier of each row of data.

In some embodiments, an operation of obtaining the row identifier of each row of data by the first storage system is as follows:

In the foregoing first storage manner, the first storage system obtains, based on the group identifier of the second row group included in the third description information, a plurality of pieces of columnstore description information including the group identifier of the second row group, obtains, based on the plurality of pieces of columnstore description information, a data segment corresponding to each column in the second row group, restores the second row group based on the data segment corresponding to each column, and obtains, based on the row status information, a row identifier of each row of data deleted from the second row group.

Alternatively, in the foregoing second storage manner, the first storage system obtains, based on the group identifier of the second row group included in the third description information, row group description information and status description information that include the group identifier of the second row group, obtains, based on the row group description information, one data segment corresponding to the second row group, restores the second row group based on the data segment, and obtains, based on the row status information, a row identifier of each row of data deleted from the second row group.

In some embodiments, a row identifier of one row of data includes a primary key of the row of data.

In some embodiments, the first storage system communicates with the second storage system by using a cloud, to be specific, the first storage system stores the insert statement and/or the delete statement at a specified location in the cloud, and the second storage system obtains the insert statement and/or the delete statement from the specified location in the cloud, so that the first storage system sends the insert statement and/or the delete statement to the second storage system.

Step 1204: The second storage system receives the first row group, and stores the first row group.

In Case 1, that is, in a case in which the first storage system sends a file, the second storage system receives the file, stores one or more data segments in the file to store the first row group, generates second description information, and stores the second description information, where the second description information is used to describe the first row group.

The received file may include a plurality of data segments corresponding to the first row group, as shown in Case 11; or the received file may include one data segment corresponding to the first row group, as shown in Case 12. The following separately describes in detail Case 11 and Case 12.

In Case 11, the file includes a plurality of data segments corresponding to the first row group, where the plurality of data segments are in one-to-one correspondence with the plurality of columns in the first row group; and the file further includes information such as an identifier of the data table, the column identifier of each column in the first row group, and the group identifier of the first row group. In step 1204, the second storage system obtains, based on the identification information of the data table, a file corresponding to each column in the data table; and for any column, stores, based on a column identifier of the column, a data segment corresponding to the column in a file corresponding to the column, to generate columnstore description information corresponding to the column, where the columnstore description information includes the group identifier of the first row group, transaction information of a third transaction, and a storage location of the data segment, the storage location includes the column identifier of the column and an offset of the data segment in the file, and the third transaction indicates time for storing the plurality of data segments. The columnstore description information corresponding to each column is obtained in the same manner. The second description information includes the columnstore description information corresponding to each column, and the columnstore description information corresponding to each column is stored in the description information list corresponding to the data table.

In some embodiments, the file further includes statistics information of each column of data in the first row group. For any column in the first row group, columnstore description information corresponding to the column further includes statistics information of data in the column.

In some embodiments, the file further includes row status information of the first row group. The second storage system generates status description information corresponding to the first row group, where the status description information includes the group identifier of the first row group, the transaction information of the third transaction, and the row status information; and stores the status description information in the description information list corresponding to the data table; and/or deletes, based on the row status information, deleted data in the first row group from the plurality of data segments.

When the second storage system backs up a plurality of first storage systems, each piece of columnstore description information corresponding to the first row group includes a source group identifier and a new group identifier allocated to the first row group, and status description information corresponding to the first row group includes the source group identifier and the new group identifier allocated to the first row group, where the source group identifier is the group identifier of the first row group.

In Case 11, the second storage system further receives the third description information and the identification information of the data table, where the third description information is used to describe at least one row of data deleted by the first storage system from the second row group within the specified time period; and deletes, based on the third description information, the at least one row of data stored in the second storage system. During implementation:

The third description information includes a group identifier of the second row group and row status information, and the row status information indicates at least one row of data that needs to be deleted from the second row group. The second storage system obtains, based on the identification information of the data table, a description information list corresponding to the data table, and obtains, from the description information list, description information including the group identifier, where the description information includes a plurality of pieces of columnstore description information, and the plurality of pieces of columnstore description information are in one-to-one correspondence with a plurality of columns in the second row group. Columnstore description information corresponding to any column includes a storage location of a data segment, the data segment is used to store data included in the column in the second row group, and the storage location includes a column identifier of the column and an offset of the data segment in a file corresponding to the column. The second storage system obtains, based on the identification information of the data table, the file corresponding to each column in the data table, and obtains, based on the offset, the data segment from the file corresponding to the column. After each data segment corresponding to the second row group is obtained, at least one row of data indicated by the row status information is deleted from the plurality of data segments.

When the second storage system backs up a plurality of first storage systems, an operation of obtaining, by the second storage system from the description information list, description information including the group identifier is as follows: The second storage system uses the group identifier of the second row group as the source group identifier, and obtains, from the description information list, the description information including the source group identifier.

In Case 12, the file includes one data segment corresponding to the first row group. The file further includes identification information of the data table and a group identifier of the first row group. In step 1204, the second storage system obtains, based on the identification information of the data table, a file corresponding to the data table, stores the data segment in the file corresponding to the data table, and generates row group description information of the first row group, where the row group description information includes the group identifier of the first row group, transaction information of a third transaction, and a storage location of the data segment, the storage location includes an offset of the data segment in the file, and the third transaction indicates time for storing the plurality of data segments. The second description information includes the row group description information, and the row group description information is stored in a description information list corresponding to the data table.

In some embodiments, the file further includes statistics information of each column of data in the first row group, and the row group description information further includes the statistics information of each column of data.

In some embodiments, the file further includes row status information of the first row group. The second storage system generates status description information corresponding to the first row group, where the status description information includes the group identifier of the first row group, the transaction information of the third transaction, and the row status information; and stores the status description information in the description information list corresponding to the data table; and/or deletes, based on the row status information, deleted data in the first row group from the data segment.

In some embodiments, the second storage system further receives the third description information, where the third description information is used to describe at least one row of data deleted by the first storage system from the second row group within the specified time period; and deletes, based on the third description information, the at least one row of data stored in the second storage system. During implementation:

The third description information includes a group identifier of the second row group and row status information, and the row status information indicates at least one row of data that needs to be deleted from the second row group. The second storage system obtains, based on the identification information of the data table, a description information list corresponding to the data table, and obtains, from the description information list, description information including the group identifier, where the description information includes one piece of row group description information, the row group description information includes a storage location of a data segment corresponding to the second row group, the data segment is used to store each row of data in the second row group, and the storage location includes an offset of the data segment in a file corresponding to the data table. The second storage system obtains, based on the identification information of the data table, the file corresponding to the data table, obtains the data segment from the file based on the offset, and deletes, from the data segment, the at least one row of data indicated by the row status information.

In Case 2, that is, when the first storage system sends the insert statement, the second storage system receives the insert statement, and stores each row of data in the second row group included in the insert statement.

In some embodiments, when the second storage system further receives the delete statement, where the delete statement includes a row identifier of each row of data in the at least one row of data in the second row group, each row of data is deleted from the second storage system based on the row identifier of each row of data.

In some embodiments, before step 1201, the first storage system receives a configuration file, where the configuration file includes a time length of the specified time period and a device identifier of the second storage system; determines the specified time period based on the time length; and backs up data to the second storage system at the end moment of the specified time period based on the device identifier of the second storage system by performing steps 1201 to 1204.

In some embodiments, in a case in which the first storage system and the second storage system communicate with each other by using the cloud, the configuration file further includes the specified location in the cloud. Optionally, the second storage system further receives the specified location. The second storage system receives the specified location sent by the first storage system or receives the specified location configured by a user.

In some embodiments, each row of data in the first row group is data of a specified service. In other words, the data of the specified service may be backed up, and the specified service is an important service, a key service, or the like.

In some embodiments, the configuration file further includes identification information of a data table corresponding to the specified service, so that the first storage system determines, based on the identification information, a data table that needs to be backed up. In other words, when obtaining the first row group that belongs to the data table, the first storage system backs up the data to the second storage system by performing steps 1201 to 1204.

In this embodiment of this application, the first storage system obtains the first description information, where the first description information is description information stored by the first storage system within the specified time period, and includes columnstore description information or row group description information stored by the first storage system within the specified time period; obtains, from the first storage system based on the first description information, the first row group stored by the first storage system within the specified time period; and sends the first row group to the second storage system. The second storage system stores the first row group. After the first storage system stores the first row group, the first row group is obtained from the first storage system based on the first description information. In this way, a process in which the first storage system stores the first row group does not need to be modified, that is, an SQL layer of the first storage system does not need to be modified, thereby reducing operation costs and maintenance difficulty. The first storage system and the second storage system may be bare metal servers. In this way, for data deployed on a bare metal server, another bare metal server may be used to back up the data on the bare metal server. In addition, because the first row group is the row group of the specified service, the second storage system may be used to back up the data of the specified service in the first storage system. Compared with backing up data of all services in the first storage system, this reduces backup costs.

Figure 13:
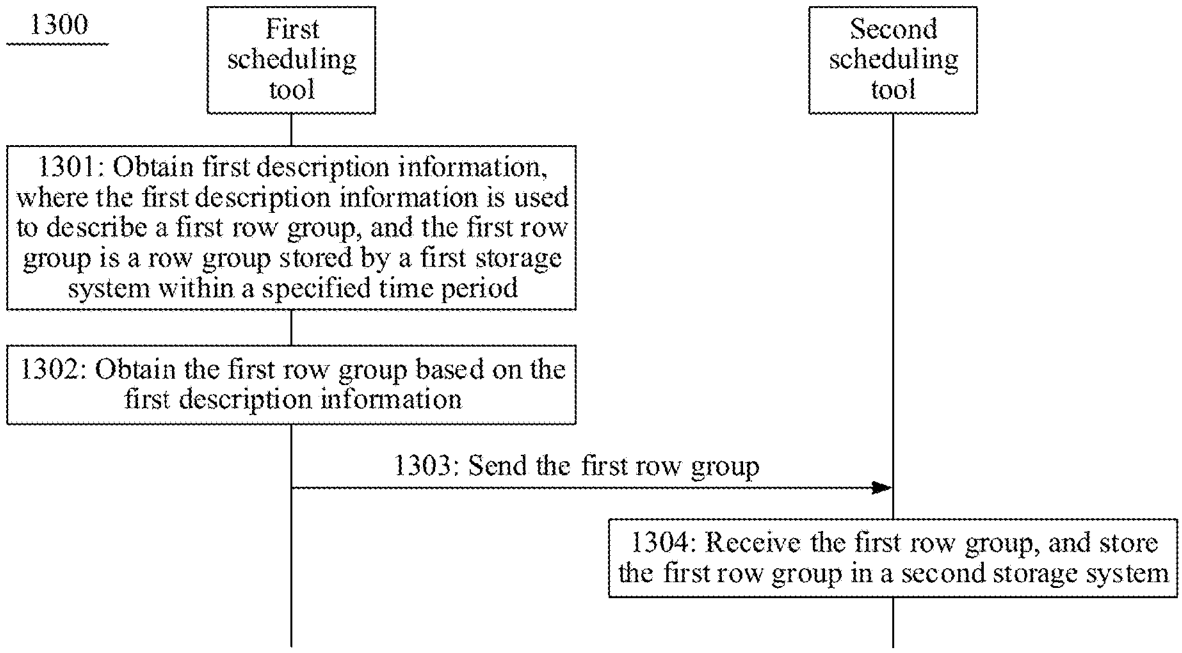
FIG. 13 is a flowchart of another data management method according to an embodiment of this application.

Refer to FIG. 13, an embodiment of this application provides a data management method 1300. The method 1300 is applied to the system 100 shown in FIG. 1, FIG. 2, or FIG. 6. In the method 1300, a first scheduling tool stores, in a second storage system, data that is stored by a first storage system within a specified time period. The method 1300 includes steps 1301 to 1304.

Step 1301: The first scheduling tool obtains first description information, where the first description information is used to describe a first row group, the first row group is a row group stored by the first storage system within the specified time period, and the first row group includes at least one row of data.

The first scheduling tool and the first storage system are different devices. In this way, in step 1301, the first scheduling tool obtains the first description information through interaction with the first storage system.

The first scheduling tool may further obtain third description information, where the third description information is used to describe at least one row of data deleted by the first storage system from a second row group, and both the first storage system and the second storage system store the second row group.

The first description information is columnstore description information stored by the first storage system within the specified time period. Alternatively, the first description information is row group description information stored by the first storage system within the specified time period.

In some embodiments, the first storage system may further obtain status description information stored by the first storage system within the specified time period. The status description information includes first status description information corresponding to the first row group and/or second status description information corresponding to the second row group. The first storage system deletes the at least one row of data from the second row group within the specified time period, the second status description information corresponding to the second row group is used to describe the at least one row of data deleted from the second row group, and the third description information includes the second status description information corresponding to the second row group.

In some embodiments, the first scheduling tool periodically obtains a row group stored in the first storage system, and stores the obtained row group in the second storage system. The specified time period is a periodicity. For example, the specified time period is a current periodicity.

The first description information includes columnstore description information newly added by the first storage system within the specified time period. Alternatively, the first description information includes row group description information newly added by the first storage system within the specified time period.

In step 1301, the first scheduling tool obtains the first description information, the third description information, and the like by performing the following operations 13011 to 13014.

13011: The first scheduling tool obtains a first transaction set, where the first transaction set includes a transaction that is being executed by the first storage system at an end moment of the specified time period.

In some embodiments, the first scheduling tool sends a snapshot instruction to the first storage system at the end moment of the specified time period. The first storage system takes a snapshot, based on the snapshot instruction, of the transaction that is being executed by the first storage system, to obtain the first transaction set, and sends the first transaction set to the first scheduling tool. The first scheduling tool receives the first transaction set.

The first transaction set is used to reflect a transaction whose execution has been completed by the first storage system before the end moment of the specified time period.

In some embodiments, the specified time period is a periodicity in addition to a $1^{st}$ periodicity, that is, the specified time period is a $2^{nd}$ periodicity, a $3^{rd}$ periodicity, a $4^{th}$ periodicity, . . . . The first scheduling tool further obtains a second transaction set, where the second transaction set is a transaction set obtained by the first scheduling tool last time, and the second transaction set includes a transaction that is being executed by the first storage system at a start moment of the specified time period.

In some embodiments, the first scheduling tool obtains and stores the second transaction set at the start moment of the specified time period. The second transaction set is used to reflect a transaction whose execution has been completed by the first storage system before the start moment of the specified time period.

13012: The first scheduling tool determines a target transaction based on the first transaction set, where the target transaction is a transaction whose execution has been completed by the first storage system within the specified time period.

In some embodiments, when the specified time period is the $1^{st}$ periodicity, the first scheduling tool determines, based on the first transaction set, the target transaction whose execution has been completed by the first storage system within the specified time period.

In some embodiments, when the specified time period is the $2^{nd}$ periodicity, the $3^{rd}$ periodicity, . . . , the first scheduling tool determines, based on the first transaction set and the second transaction set, the target transaction whose execution has been completed by the first storage system within the specified time period.

In 12013, the target transaction may be a first transaction, and the first transaction indicates time for storing the first row group by the first storage system; or the target transaction may be a second transaction, and the second transaction indicates time for deleting the at least one row of data from the second row group by the first storage system.

13013: The first scheduling tool obtains description information that has been generated by the first storage system.

In some embodiments, the first storage system includes a description information list, and the description information list includes the description information that has been generated by the first storage system. The first scheduling tool obtains the description information list from the first storage system.

13014: The first scheduling tool selects, from the description information that has been generated by the first storage system, description information including transaction information of the target transaction, where the selected description information includes the transaction information of the target transaction.

In the foregoing first storage manner, the first scheduling tool selects, from the description information list, the description information including the transaction information of the target transaction; and if the selected description information includes a plurality of pieces of columnstore description information and status description information, determines that the target transaction is the first transaction, where the first description information includes the plurality of pieces of columnstore description information; or if the selected description information includes only status description information, determines that the target transaction is the second transaction, where the third description information includes the status description information, the status description information is the second status description information that is stored by the first storage system when the first storage system deletes data from the second row group, and the third description information includes the status description information.

In the foregoing second storage manner, the first scheduling tool selects, from the description information list, the description information including the transaction information of the target transaction; and if the selected description information includes one piece of row group description information and status description information, determines that the target transaction is the first transaction, where the first description information includes the row group description information; or if the selected description information includes only status description information, determines that the target transaction is the second transaction, where the third description information includes the status description information, the status description information is the second status description information that is stored by the first storage system when the first storage system deletes data from the second row group, and the third description information includes the status description information.

In some embodiments, the first scheduling tool selects at least one piece of description information from the description information list based on a row group range, where the row group range includes a row group operated by the first storage system within the specified time period, and a row group corresponding to a group identifier included in each piece of description information in the at least one piece of description information belongs to the row group range; and selects, from the at least one piece of description information, the description information including the transaction information of the target transaction.

In some embodiments, when the first storage system operates a row group, the first storage system records a group identifier of the row group. Therefore, the row group range includes a group identifier of a row group recorded by the first storage system within the specified time period. The first storage system may send the row group range to the first scheduling tool.

For the foregoing operations 13012 to 13014, the following lists an implementation instance of implementing the operations 13012 to 13014. The implementation instance is implemented by performing the following operations (1) to (4).

(1): The first scheduling tool starts scanning from $1^{st}$ piece of description information in the description information list, and performs the following operation (2) each time one piece of description information is scanned.

In some embodiments, when obtaining one piece of description information through scanning, the first scheduling tool performs the following operation (2) when a row group corresponding to a group identifier included in the description information is a row group in the row group range; or scans a next piece of scanning information in the description information list when a row group corresponding to a group identifier included in the description information is not a row group in the row group range.

(2): The first scheduling tool determines a transaction corresponding to transaction information included in the description information, and determines, based on the first transaction set, whether the transaction is a transaction whose execution has been completed by the first storage system within the specified time period.

When the specified time period is the $1^{st}$ periodicity, the first scheduling tool determines, based on the first transaction set, whether the transaction is a transaction whose execution has been completed by the first storage system within the specified time period. When the specified time period is the $2^{nd}$ periodicity, the $3^{rd}$ periodicity, . . . , the first scheduling tool determines, based on the first transaction set and the second transaction set, whether the transaction is a transaction whose execution has been completed by the first storage system within the specified time period.

(3) If the transaction is a transaction whose execution has been completed by the first storage system within the specified time period, the first scheduling tool selects the description information, where the description information includes description information generated by the first storage system within the specified time period.

If the description information includes indication information, the indication information indicates that the description information is status description information, that is, the description information is the status description information. If the description information does not include the indication information, the description information is columnstore description information or row group description information.

(4): The first scheduling tool obtains, from the description information list, Z pieces of description information including transaction information of a same target transaction, where Z is an integer greater than 0.

In the foregoing first storage manner, if the Z pieces of description information include a plurality of pieces of columnstore description information and one piece of status description information, the first description information includes the plurality of pieces of columnstore description information; and if the Z pieces of description information include one piece of status description information, the third description information includes the piece of status description information.

In the foregoing second storage manner, if the Z pieces of description information include one piece of row group description information and one piece of status description information, the first description information includes the piece of row group description information; and if the Z pieces of description information include one piece of status description information, the third description information includes the piece of status description information.

It should be noted that, for the first row group stored by the first storage system within the specified time period, the description information obtained by the first scheduling tool includes the first description information corresponding to the first row group and the status description information corresponding to the first row group; and for the at least one row of data deleted by the first storage system from the second row group within the specified time period, the description information obtained by the first scheduling tool includes the third description information corresponding to the second row group.

Step 1302: The first scheduling tool obtains the first row group based on the first description information.

In some embodiments, in step 1302, the first scheduling tool sends the first description information to the first storage system; the first storage system obtains, based on the first description information, a data segment corresponding to the first row group, and sends the data segment corresponding to the first row group to the first scheduling tool; and the first scheduling tool receives the data segment corresponding to the first row group, that is, obtains the first row group.

For an operation of obtaining, by the first storage system, the data segment corresponding to the first row group, refer to the related content in step 1202 in the method 1200 shown in FIG. 12. Details are not described herein again. In the foregoing first storage manner, the first row group corresponds to a plurality of data segments. In the foregoing second storage manner, the first row group corresponds to one data segment.

In some embodiments, in step 1302, the first scheduling tool sends the first description information to the first storage system; the first storage system obtains each row of data in the first row group based on the first description information, and sends each row of data in the first row group to the first scheduling tool; and the first scheduling tool receives each row of data in the first row group.

For an operation of obtaining, by the first storage system, each row of data in the first row group, refer to the related content in step 1202 in the method 1200 shown in FIG. 12. Details are not described herein again.

Step 1303: The first scheduling tool sends the first row group to a second scheduling tool.

In some embodiments, the first scheduling tool sends a file to the second scheduling tool, where the file includes the data segment corresponding to the first row group or the plurality of data segments corresponding to the first row group.

In a case in which the first scheduling tool obtains the plurality of data segments corresponding to the first row group, the first scheduling tool sends the file to the second scheduling tool, where the file includes the plurality of data segments, and the plurality of data segments are in one-to-one correspondence with a plurality of columns in the first row group. Optionally, the file further includes identification information of a data table, a group identifier of the first row group, a column identifier of each column in the first row group, row status information, statistics information of each column of data in the first row group, and/or the like. Columnstore description information of any column includes statistics information of data in the column in the first row group, and the first scheduling tool obtains the statistics information of the column of data from the columnstore description information.

In a case in which the first scheduling tool obtains the data segment corresponding to the first row group, the first scheduling tool sends the file to the second scheduling tool, where the file includes the data segment. Optionally, the file further includes a group identifier of the first row group, row status information, statistics information of each column of data in the first row group, and/or the like. Row group description information corresponding to the first row group includes the statistics information of each column of data in the first row group, and the first scheduling tool obtains the statistics information of each column of data from the row group description information.

If the first scheduling tool further obtains the third description information, the first scheduling tool sends the third description information and the identification information of the data table to the second scheduling tool.

In some embodiments, the first scheduling tool communicates with the second scheduling tool by using a cloud. The first scheduling tool stores the file at a specified location in the cloud, and the second scheduling tool obtains the file from the specified location in the cloud; and/or the first scheduling tool stores the third description information and the identification information of the data table at the specified location in the cloud, and the second scheduling tool obtains the third description information and the identification information of the data table from the specified location in the cloud.

In some embodiments, the first scheduling tool sends an insert statement to the second scheduling tool, where the insert statement includes the identification information of the data table and each row of data in the first row group.

In some embodiments, the first scheduling tool generates an insert statement, where the insert statement includes the identification information of the data table and each row of data in the first row group; and sends the insert statement to the second storage system.

In some embodiments, the first scheduling tool further obtains where the third description information, the third description information includes a group identifier of the second row group and row status information, and the row status information indicates the at least one row of data deleted from the second row group. The first scheduling tool obtains a row identifier of each row of data in the at least one row of data based on the group identifier of the second row group and the row status information; and sends a delete statement to the second scheduling tool, where the delete statement includes the identification information of the data table and the row identifier of each row of data.

In some embodiments, an operation of obtaining, by the first scheduling tool, the row identifier of each row of data is as follows: The first scheduling tool sends the third description information to the first storage system.

The first storage system obtains, based on the group identifier of the second row group included in the third description information, a plurality of pieces of columnstore description information and status description information that include the group identifier of the second row group, obtains, based on the plurality of pieces of columnstore description information, a data segment corresponding to each column in the second row group, obtains the second row group based on the data segment corresponding to each column, and obtains, based on the row status information, the row identifier of each row of data in the at least one row of data deleted from the second row group.

The first storage system obtains, based on the group identifier of the second row group included in the third description information, row group description information and status description information that include the group identifier of the second row group, obtains, based on the row group description information, the data segment corresponding to the second row group, obtains the second row group based on the data segment, and obtains, based on the status description information, the row identifier of each row of data in the at least one row of data deleted from the second row group.

The first storage system sends the row identifier of each row of data in the at least one row of data to the first scheduling tool. The first scheduling tool receives the row identifier of each row of data in the at least one row of data.

In some embodiments, the first scheduling tool communicates with the second scheduling tool by using the cloud, to be specific, the first scheduling tool stores the insert statement and/or the delete statement at the specified location in the cloud, and the second scheduling tool obtains the insert statement and/or the delete statement from the specified location in the cloud.

Step 1304: The second scheduling tool receives the first row group, and stores the first row group in the second storage system.

In a case in which the first scheduling tool sends a file, the second scheduling tool receives the file, stores one or more data segments in the file, generates second description information, and stores the second description information in the second storage system, where the second description information is used to describe the first row group.

In some embodiments, the file includes the plurality of data segments corresponding to the first row group, and the plurality of data segments are in one-to-one correspondence with the plurality of columns in the first row group. In step 1304, for any column, the second scheduling tool obtains, from the second storage system based on the identification information of the data table and a column identifier of the column, a file corresponding to the column; stores a data segment corresponding to the column in the file corresponding to the column; and generates columnstore description information corresponding to the column, where the columnstore description information includes the group identifier of the first row group, transaction information of a third transaction, and a storage location of the data segment, the storage location includes the column identifier of the column and an offset of the data segment in the file, and the third transaction indicates time for storing the plurality of data segments. The columnstore description information corresponding to each column is obtained in the same manner. The second description information includes the columnstore description information corresponding to each column, and the columnstore description information corresponding to each column is stored in the description information list corresponding to the data table in the second storage system.

In some embodiments, the file further includes statistics information of each column of data in the first row group. For any column in the first row group, columnstore description information corresponding to the column further includes statistics information of data in the column.

In some embodiments, the file further includes row status information of the first row group. The second scheduling tool generates status description information corresponding to the first row group, where the status description information includes the group identifier of the first row group, the transaction information of the third transaction, and the row status information; and stores the status description information in a description information list in the second storage system; and/or deletes, based on the row status information, deleted data in the first row group from the plurality of data segments included in the second storage system.

In some embodiments, the second scheduling tool further receives the third description information, where the third description information is used to describe at least one row of data deleted by the first storage system from the second row group within the specified time period; and deletes, based on the third description information, the at least one row of data stored in the second storage system. During implementation:

The third description information includes a group identifier of the second row group and row status information, and the row status information indicates at least one row of data that needs to be deleted from the second row group. The second scheduling tool obtains, based on the identification information of the data table, a description information list corresponding to the data table, and obtains, from the description information list, description information including the group identifier, where the description information includes a plurality of pieces of columnstore description information, and the plurality of pieces of columnstore description information are in one-to-one correspondence with a plurality of columns in the second row group. Columnstore description information corresponding to any column includes a storage location of a data segment, the data segment is used to store data included in the column in the second row group, and the storage location includes a column identifier of the column and an offset of the data segment in a file corresponding to the column. The second scheduling tool sends a deletion instruction to the second storage system, where the deletion instruction includes the identification information of the data table, the plurality of pieces of columnstore description information, and the row status information.

The second storage system receives the deletion instruction, obtains, based on the identification information of the data table, the file corresponding to each column in the data table, and obtains, based on the offset, the data segment from the file corresponding to the column. After each data segment corresponding to the second row group is obtained, at least one row of data indicated by the row status information is deleted from the plurality of data segments.

When the second storage system backs up a plurality of first storage systems, an operation of obtaining, by the second scheduling tool from the description information list, description information including the group identifier is as follows: The second scheduling tool uses the group identifier of the second row group as the source group identifier, and obtains, from the description information list, the description information including the source group identifier.

In some embodiments, the file includes the data segment corresponding to the first row group and the identification information of the data table. In step 1304, the second scheduling tool obtains, based on the identification information of the data table, a file corresponding to the data table from the second storage system, stores the data segment in the file corresponding to the data table, and generates row group description information of the first row group, where the row group description information includes the group identifier of the first row group, transaction information of a third transaction, and a storage location of the data segment, the storage location includes an offset of the data segment in the file, and the third transaction indicates time for storing the plurality of data segments. The second description information includes the row group description information, and the row group description information is stored in a description information list corresponding to the data table in the second storage system.

In some embodiments, the file further includes statistics information of each column of data in the first row group, and the row group description information further includes the statistics information of each column of data.

In some embodiments, the file further includes row status information of the first row group. The second storage system generates status description information corresponding to the first row group, where the status description information includes the group identifier of the first row group, the transaction information of the third transaction, and the row status information; and stores the status description information in the description information list corresponding to the data table; and/or deletes, based on the row status information, deleted data in the first row group from the data segment.

When the second storage system backs up a plurality of first storage systems, row group description information corresponding to the first row group includes a source group identifier and a new group identifier allocated to the first row group, and status description information corresponding to the first row group includes the source group identifier and the new group identifier allocated to the first row group, where the source group identifier is the group identifier of the first row group.

In some embodiments, the second scheduling tool further receives the third description information, where the third description information is used to describe at least one row of data deleted by the first storage system from the second row group within the specified time period; and deletes, based on the third description information, the at least one row of data stored in the second storage system. During implementation:

The third description information includes a group identifier of the second row group and row status information, and the row status information indicates at least one row of data that needs to be deleted from the second row group. The second scheduling tool obtains, based on the identification information of the data table, a description information list corresponding to the data table, and obtains, from the description information list, description information including the group identifier, where the description information includes one piece of row group description information, the row group description information includes a storage location of a data segment corresponding to the second row group, the data segment is used to store each row of data in the second row group, and the storage location includes an offset of the data segment in a file corresponding to the data table. The second scheduling tool sends a deletion instruction to the second storage system, where the deletion instruction includes the identification information of the data table, the row group description information, and the row status information.

The second storage system receives the deletion instruction, obtains, based on the identification information of the data table, the file corresponding to the data table, and obtains the data segment from the file based on the offset. After the data segment corresponding to the second row group is obtained, the at least one row of data indicated by the row status information is deleted from the data segment.

When the second storage system backs up a plurality of first storage systems, an operation of obtaining, by the second scheduling tool from the description information list, description information including the group identifier is as follows: The second scheduling tool uses the group identifier of the second row group as the source group identifier, and obtains, from the description information list, the description information including the source group identifier.

When the first scheduling tool sends the insert statement, the second scheduling tool receives the insert statement, and stores, in the second storage system, each row of data in the second row group included in the insert statement. During implementation:

The second scheduling tool sends the insert statement to the second storage system, and the second storage system stores each row of data in the second row group included in the insert statement.

In some embodiments, in a case in which the second scheduling tool further receives a delete statement, where the delete statement includes a row identifier of each row of data in the at least one row of data in the second row group, the second scheduling tool sends the delete statement to the second storage system. The second storage system deletes each row of data from the second storage system based on the row identifier of each row of data.

In some embodiments, before step 1301, the first scheduling tool receives a configuration file, where the configuration file includes a time length of the specified time period and a device identifier of the second scheduling tool; determines the specified time period based on the time length; and sends the first row group to the second scheduling tool at an end moment of the specified time period based on the device identifier of the second scheduling tool by performing steps 1301 to 1304. The second scheduling tool stores the first row group in the second storage system.

In some embodiments, in a case in which the first scheduling tool and the second scheduling tool communicate by using the cloud, the configuration file further includes the specified location in the cloud. Optionally, the second scheduling tool further receives the specified location. The second scheduling tool receives the specified location sent by the first scheduling tool or receives the specified location configured by a user.

In some embodiments, each row of data in the first row group is data of a specified service. In other words, the data of the specified service may be backed up, and the specified service is an important service, a key service, or the like.

In some embodiments, the configuration file further includes identification information of a data table corresponding to the specified service, so that the first storage system determines, based on the identification information, a data table that needs to be backed up. In other words, when obtaining the first row group that belongs to the data table, the first scheduling tool sends the data to the second scheduling tool by performing steps 1301 to 1304.

In this embodiment of this application, the first scheduling tool obtains the first description information, where the first description information is description information newly added by the first storage system within the specified time period, and includes columnstore description information or row group description information stored by the first storage system within the specified time period; obtains, from the first storage system based on the first description information, the first row group stored by the first storage system within the specified time period; and sends the first row group to the second scheduling tool. The second scheduling tool stores the first row group in the second storage system. After the first storage system stores the first row group, the first scheduling tool obtains the first row group from the first storage system based on the first description information. In this way, a process in which the first storage system stores the first row group does not need to be modified, that is, an SQL layer of the first storage system does not need to be modified, thereby reducing operation costs and maintenance difficulty. The first storage system and the second storage system may be bare metal servers. In this way, for data deployed on a bare metal server, another bare metal server may be used to back up the data on the bare metal server. In addition, because the first row group is the row group of the specified service, the second storage system may be used to back up the data of the specified service in the first storage system. Compared with backing up data of all services in the first storage system, this reduces backup costs.

Figure 14:
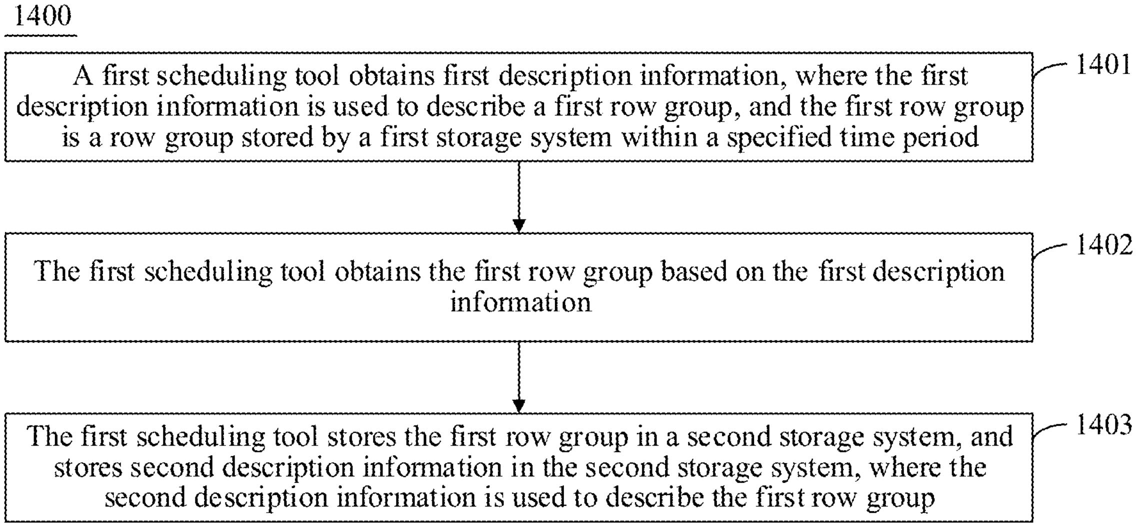
FIG. 14 is a flowchart of another data management method according to an embodiment of this application.

Refer to FIG. 14, an embodiment of this application provides a data management method 1400. The method 1400 is applied to the system 100 shown in FIG. 1 or FIG. 4. In the method 1400, a first scheduling tool stores, in a second storage system, data that is stored by a first storage system within a specified time period. The method 1400 includes steps 1401 to 1403.

Step 1401: The first scheduling tool obtains first description information, where the first description information is used to describe a first row group, the first row group is a row group stored by the first storage system within the specified time period, and the first row group includes at least one row of data.

The first scheduling tool and the first storage system may be different devices. In this way, in step 1401, the first scheduling tool obtains the first description information through interaction with the first storage system.

For a detailed implementation process in which the first scheduling tool obtains the first description information, refer to the related content in step 1301 in the method 1300 shown in FIG. 13. Details are not described herein again.

Step 1402: The first scheduling tool obtains the first row group based on the first description information.

For a detailed implementation process in which the first scheduling tool obtains the first row group, refer to the related content in step 1302 in the method 1300 shown in FIG. 13. Details are not described herein again.

Step 1403: The first scheduling tool stores the first row group in the second storage system, and stores second description information in the second storage system, where the second description information is used to describe the first row group.

For a detailed implementation process in which the first scheduling tool stores the first row group in the second storage system and stores the second description information in the second storage system, refer to the related content in step 1304 in the method 1300 shown in FIG. 13. Details are not described herein again.

In this embodiment of this application, the first scheduling tool obtains the first description information, where the first description information is description information stored by the first storage system within the specified time period, and includes columnstore description information or row group description information stored by the first storage system within the specified time period; obtains, from the first storage system based on the first description information, the first row group stored by the first storage system within the specified time period; and stores the first row group in the second storage system. After the first storage system stores the first row group, the first scheduling tool obtains the first row group from the first storage system based on the first description information. In this way, a process in which the first storage system stores the first row group does not need to be modified, that is, an SQL layer of the first storage system does not need to be modified, thereby reducing operation costs and maintenance difficulty.

The first storage system is a primary system of the second storage system, and the second storage system is a secondary system of the first storage system. When the first storage system is normal, the first storage system provides a service. For an application and/or a terminal device that need/needs the service, the application and/or the terminal device may read/write the first storage system, but read only the second storage system.

Figure 15:
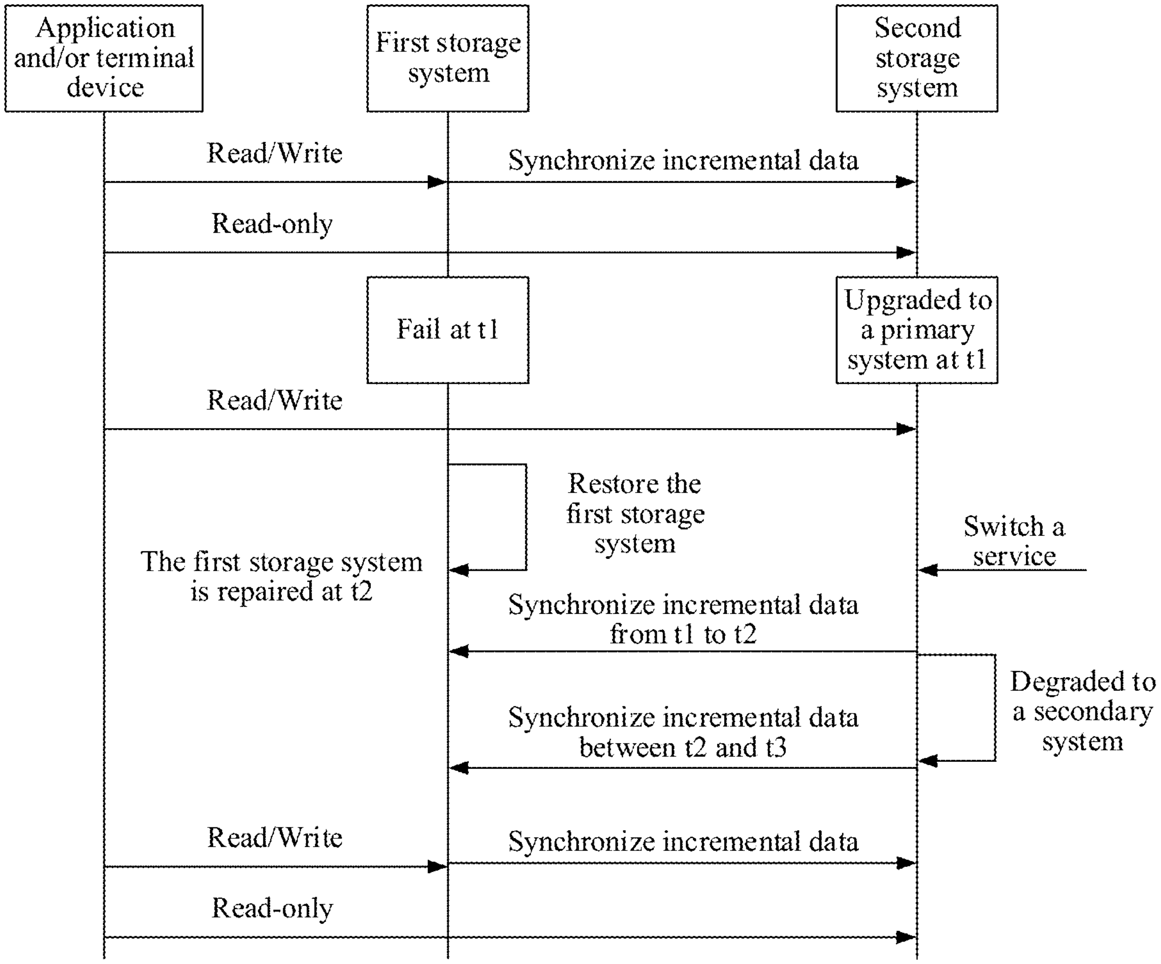
FIG. 15 is a flowchart of another data management method according to an embodiment of this application.

For data stored in the first storage system within the specified time period, the data is incremental data of the first storage system within the specified time period. Refer to FIG. 15, the incremental data is synchronized to the second storage system by using the method 1200 shown in FIG. 12, the method 1300 shown in FIG. 13, or the method 1400 shown in FIG. 14. At a moment t1, when the first storage system is faulty, the second storage system changes to the primary system, and the service is switched from the first storage system to the second storage system. In this case, the application and/or the terminal device may read/write the second storage system, and the second storage system provides the service.

After the first storage system is faulty, the first storage system may be repaired. At a moment t2, the first storage system is recovered, and the second storage system is triggered to switch the service, where t2 is later than t1. For the incremental data between t1 and t2 in the second storage system, the incremental data is synchronized to the first storage system by using the method 1200 shown in FIG. 12, the method 1300 shown in FIG. 13, or the method 1400 shown in FIG. 14.

At a moment t3, the second storage system completes synchronization of the incremental data between t1 and t2, and the second storage system changes to the secondary storage system, where t3 is later than t2, and the application and/or the terminal device read/reads only the second storage system. For the incremental data between t2 and t3 in the second storage system, the incremental data between t2 and t3 is synchronized to the first storage system by using the method 1200 shown in FIG. 12, the method 1300 shown in FIG. 13, or the method 1400 shown in FIG. 14. When the incremental data between t2 and t3 is synchronized, the first storage system changes to the primary system, the application and/or the terminal device can read/write the first storage system, and read only the second storage system.

For incremental data stored by the first storage system after t3, the incremental data is synchronized to the second storage system by using the method 1200 shown in FIG. 12, the method 1300 shown in FIG. 13, or the method 1400 shown in FIG. 14.

Figure 16:
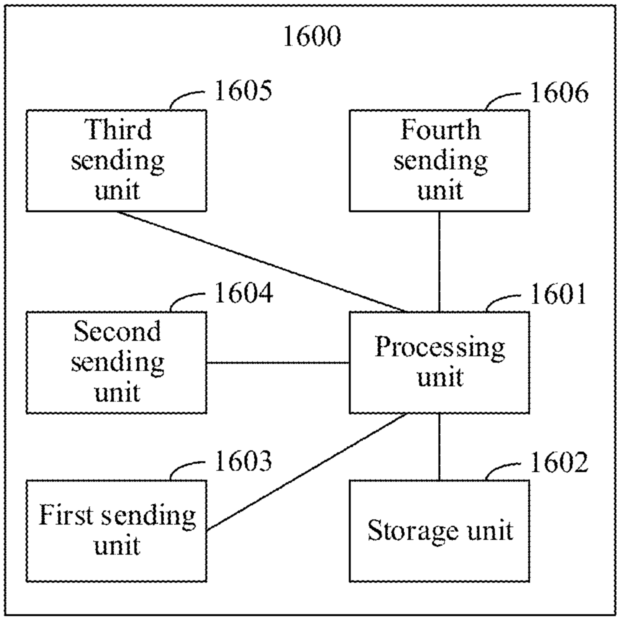
FIG. 16 is a diagram of a structure of a data management apparatus according to an embodiment of this application.

Refer to FIG. 16, an embodiment of this application provides a data management apparatus 1600. The apparatus 1600 is used in the first storage system in the system 100 in FIG. 1, FIG. 3, or FIG. 5, or the apparatus 1600 is used in the first scheduling tool in the system 100 in FIG. 2, FIG. 4, or FIG. 6, or the apparatus 1600 is used in the first storage system in the method 700 in FIG. 7, the method 900 in FIG. 9, the method 1100 in FIG. 11, or the method 1200 in FIG. 12, or the apparatus is used in the first scheduling tool in the method 1300 in FIG. 13 or the method 1400 in FIG. 14. The apparatus 1600 includes:

a processing unit 1601, configured to obtain first description information, where the first description information is used to describe a first row group, the first row group is a row group stored by the apparatus 1600 within a specified time period, and the first row group includes at least one row of data; and a storage unit 1602, configured to store the first row group in a second storage system based on the first description information.

Optionally, for a detailed implementation process in which the processing unit 1601 obtains the first description information, refer to the related content in step 1201 in the method 1200 in FIG. 12, step 1301 in the method 1300 in FIG. 13, or step 1401 in the method 1400 in FIG. 14. Details are not described herein again.

Optionally, for a detailed implementation process in which the storage unit 1602 stores the first row group in the second storage system, refer to the related content in steps 1202 to 1204 in the method 1200 in FIG. 12, steps 1302 to 1304 in the method 1300 in FIG. 13, or steps 1402 and 1403 in the method 1400 in FIG. 14. Details are not described herein again.

Optionally, the first description information includes transaction information of a first transaction, and the first transaction is a transaction whose execution has been completed by the apparatus 1600 within the specified time period.

The processing unit 1601 is configured to:

determine the first transaction; and select, from description information that has been generated by the apparatus 1600, the first description information including the transaction information of the first transaction.

Optionally, for a detailed implementation process in which the processing unit 1601 determines the first transaction and selects the first description information, refer to the related content in the operations 12012 and 12013 in the method 1200 in FIG. 12 and the operations 13012 and 12013 in the method 1300 in FIG. 13. Details are not described herein again.

Optionally, the processing unit 1601 is configured to:

obtain a first transaction set, where the first transaction set includes a transaction that is executed by the apparatus 1600 at an end moment of the specified time period, and the first transaction set is used to reflect a transaction whose execution has been completed by the apparatus 1600 before the end moment; and determine the first transaction based on the first transaction set.

Optionally, for a detailed implementation process in which the processing unit 1601 obtains the first transaction set, refer to the related content in the operation 12011 in the method 1200 in FIG. 12 and the operation 13011 in the method 1300 in FIG. 13. Details are not described herein again.

Optionally, for a detailed implementation process in which the processing unit 1601 determines the first transaction, refer to the related content in the operation 12012 in the method 1200 in FIG. 12 and the operation 13012 in the method 1300 in FIG. 13. Details are not described herein again.

Optionally, the processing unit 1601 is configured to:

obtain a second transaction set, where the second transaction set includes a transaction that is executed by the apparatus 1600 at a start moment of the specified time period, and the second transaction set is used to reflect a transaction whose execution has been completed by the apparatus 1600 before the start moment; and determine the first transaction based on the first transaction set and the second transaction set.

Optionally, for a detailed implementation process in which the processing unit 1601 obtains the second transaction set, refer to the related content in the operation 12011 in the method 1200 in FIG. 12 and the operation 13011 in the method 1300 in FIG. 13. Details are not described herein again.

Optionally, for a detailed implementation process in which the processing unit 1601 determines the first transaction, refer to the related content in the operation 12012 in the method 1200 in FIG. 12 and the operation 13012 in the method 1300 in FIG. 13. Details are not described herein again.

Optionally, the processing unit 1601 is configured to:

select, based on a row group range, at least one piece of description information from the description information that has been generated by the apparatus 1600, where the row group range includes a row group operated by the apparatus 1600 within the specified time period, and a row group corresponding to a group identifier included in each piece of description information in the at least one piece of description information belongs to the row group range; and select, from the at least one piece of description information, the first description information including the transaction information of the first transaction.

Optionally, for a detailed implementation process in which the processing unit 1601 selects the at least one piece of description information based on the row group range and selects the first description information from the at least one piece of description information, refer to the related content in the operation 12013 in the method 1200 in FIG. 12 and the operation 13013 in the method 1300 in FIG. 13. Details are not described herein again.

Optionally, the first description information includes a storage location of a data segment corresponding to the first row group, the data segment includes data in the first row group, and the apparatus 1600 and the second storage system are storage systems of a same type.

The apparatus 1600 further includes a first sending unit 1603.

The processing unit 1601 is further configured to obtain the data segment based on the storage location.

The first sending unit 1603 is configured to send a file to the second storage system, where the file includes the data segment, and the file is used to trigger the second storage system to store the data segment.

Optionally, for a detailed implementation process in which the processing unit 1601 obtains the data segment, refer to the related content in step 1202 in the method 1200 in FIG. 12 or step 1302 in the method 1300 in FIG. 13. Details are not described herein again.

Optionally, for a detailed implementation process in which the first sending unit 1603 sends the file to the second storage system, refer to the related content in step 1203 in the method 1200 in FIG. 12 or step 1303 in the method 1300 in FIG. 13. Details are not described herein again.

Optionally, the file further includes first row status information, the first row status information indicates undeleted data in the first row group, and the file is further used to trigger the second storage system to store the first row status information or delete deleted data in the first row group from the data segment based on the first row status information.

Optionally, the file further includes a group identifier of the first row group and/or a column identifier corresponding to each column of data in the first row group, the file is further used to trigger the second storage system to obtain second description information based on the group identifier of the first row group and the column identifier corresponding to each column of data, and the second description information is used to describe the first row group.

Optionally, the file further includes statistics information corresponding to each column of data, and the second description information further includes the statistics information corresponding to each column of data.

Optionally, the first description information includes a group identifier of the first row group and a storage location of a data segment corresponding to the first row group, and the data segment includes data in the first row group; and the apparatus 1600 further includes a second sending unit 1604.

The processing unit 1601 is further configured to obtain the first row group based on the group identifier and the storage location.

The second sending unit 1604 is configured to send an insert statement to the second storage system, where the insert statement includes each row of data in the first row group, and the insert statement is used to trigger the second storage system to store each row of data in the first row group.

Optionally, for a detailed implementation process in which the processing unit 1601 obtains the first row group, refer to the related content in step 1202 in the method 1200 in FIG. 12 or step 1302 in the method 1300 in FIG. 13. Details are not described herein again.

Optionally, for a detailed implementation process in which the second sending unit 1604 sends the insert statement to the second storage system, refer to the related content in step 1203 in the method 1200 in FIG. 12 or step 1303 in the method 1300 in FIG. 13. Details are not described herein again.

Optionally, the processing unit 1601 is further configured to:

- obtain third description information, where the third description information is used to describe at least one row of data deleted by the apparatus 1600 from a second row group within the specified time period, the second row group is a row group stored in the apparatus 1600, and the second storage system stores the second row group; and
- delete, based on the third description information, the at least one row of data stored in the second storage system.

Optionally, for a detailed implementation process in which the processing unit 1601 obtains the third description information, refer to the related content in step 1201 in the method 1200 in FIG. 12, step 1301 in the method 1300 in FIG. 13, or step 1401 in the method 1400 in FIG. 14. Details are not described herein again.

Optionally, for a detailed implementation process in which the processing unit 1601 deletes the at least one row of data stored in the second storage system, refer to the related content in step 1203 in the method 1200 in FIG. 12, step 1303 in the method 1300 in FIG. 13, or step 1403 in the method 1400 in FIG. 14. Details are not described herein again.

Optionally, the apparatus 1600 and the second storage system are storage systems of a same type, the third description information includes a group identifier of the second row group and second row status information, and the second row status information indicates the at least one row of data; and the apparatus 1600 further includes a third sending unit 1605.

The third sending unit 1605 is configured to send the third description information to the second storage system, where the third description information is used to trigger the second storage system to delete the at least one row of data based on the group identifier and the second row status information.

Optionally, for a detailed implementation process in which the third sending unit 1605 sends the third description information, refer to the related content in step 1203 in the method 1200 in FIG. 12 or step 1303 in the method 1300 in FIG. 13. Details are not described herein again.

Optionally, the third description information includes a group identifier of the second row group and second row status information, and the second row status information indicates the at least one row of data; and the apparatus 1600 further includes a fourth sending unit 1606.

The processing unit 1601 is configured to obtain a row identifier of each row of data in the at least one row of data based on the group identifier and the second row status information.

The fourth sending unit 1606 is configured to send a delete statement to the second storage system, where the delete statement includes the row identifier of each row of data, and the delete statement is used to trigger the second storage system to delete the at least one row of data.

Optionally, for a detailed implementation process in which the processing unit 1601 obtains the row identifier of each row of data in the at least one row of data, refer to the related content in step 1203 in the method 1200 in FIG. 12 or step 1303 in the method 1300 in FIG. 13. Details are not described herein again.

Optionally, for a detailed implementation process in which the fourth sending unit 1606 sends the delete statement, refer to the related content in step 1203 in the method 1200 in FIG. 12 or step 1303 in the method 1300 in FIG. 13. Details are not described herein again.

Optionally, the apparatus 1600 is a database system or a data warehouse system, and the second storage system is a database system or a data warehouse system.

Optionally, each row of data in the first row group is data of a specified service.

The processing unit 1601, the storage unit 1602, the first sending unit 1603, the second sending unit 1604, the third sending unit 1605, and the fourth sending unit 1606 all may be implemented by using software, or may be implemented by using hardware. For example, the following uses the processing unit 1601 as an example to describe an implementation of the processing unit 1601. Similarly, for implementations of the storage unit 1602, the first sending unit 1603, the second sending unit 1604, the third sending unit 1605, and the fourth sending unit 1606, refer to the implementation of the processing unit 1601.

The unit is used as an example of a software functional unit, and the processing unit 1601 may include code running on a computing instance. The computing instance may include at least one of a physical host (computing device), a virtual machine, and a container. Further, there may be one or more computing devices. For example, the processing unit 1601 may include code running on a plurality of hosts/virtual machines/containers. It should be noted that the plurality of hosts/virtual machines/containers for running the code may be distributed in a same region, or may be distributed in different regions. Further, the plurality of hosts/virtual machines/containers for running the code may be distributed in a same availability zone (AZ), or may be distributed in different AZs. Each AZ includes one data center or a plurality of data centers that are geographically close to each other. Generally, one region may include a plurality of AZs.

Similarly, the plurality of hosts/virtual machines/containers for running the code may be distributed in a same virtual private cloud (VPC), or may be distributed in a plurality of VPCs. Generally, one VPC is set in one region. A communication gateway needs to be set in each VPC for communication between two VPCs in a same region or between VPCs in different regions. Interconnection between VPCs is implemented through the communication gateway.

The unit is used as an example of a hardware functional unit, and the processing unit 1601 may include at least one computing device, such as a server. Alternatively, the processing unit 1601 may be a device implemented by using an application-specific integrated circuit (ASIC) or a programmable logic device (PLD), or the like. The PLD may be a complex programmable logical device (CPLD), a field-programmable gate array (FPGA), a generic array logic (GAL), or any combination thereof.

The plurality of computing devices included in the processing unit 1601 may be distributed in a same region, or may be distributed in different regions. The plurality of computing devices included in the processing unit 1601 may be distributed in a same AZ, or may be distributed in different AZs. Similarly, the plurality of computing devices included in the processing unit 1601 may be distributed in a same VPC, or may be distributed in a plurality of VPCs. The plurality of computing devices may be any combination of computing devices such as a server, an ASIC, a PLD, a CPLD, an FPGA, and a GAL.

It should be noted that, in another embodiment, the processing unit 1601 may be configured to perform any step in the foregoing data management method, the storage unit 1602 may be configured to perform any step in the foregoing data management method, the first sending unit 1603 may be configured to perform any step in the foregoing data management method, the second sending unit 1604 may be configured to perform any step in the foregoing data management method, the third sending unit 1605 may be configured to perform any step in the foregoing data management method, and the fourth sending unit 1606 may be configured to perform any step in the foregoing data management method. Steps implemented by the processing unit 1601, the storage unit 1602, the first sending unit 1603, the second sending unit 1604, the third sending unit 1605, and the fourth sending unit 1606 may be specified as required. The processing unit 1601, the storage unit 1602, the first sending unit 1603, the second sending unit 1604, the third sending unit 1605, and the fourth sending unit 1606 respectively implement different steps in the foregoing data management method, to implement all functions of the data management apparatus 1600.

In this embodiment of this application, because the first description information is used to describe the first row group, and the first row group is a row group stored by the apparatus within the specified time period, the first row group stored in the apparatus can be obtained based on the first description information. In other words, after the apparatus completes a process of storing the first row group, the processing unit obtains the first description information, obtains the first row group from the first storage system based on the first description information, and stores the first row group in the second storage system, thereby ensuring that data in the apparatus is consistent with data in the second storage system. In this way, a process in which the apparatus stores data is not modified, that is, an SQL access layer of the apparatus does not need to be modified, thereby reducing operation costs and maintenance difficulty.

Figure 17:
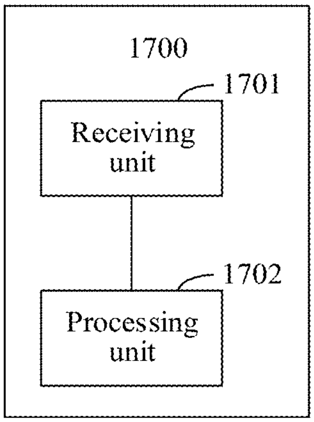
FIG. 17 is a diagram of a structure of another data management apparatus according to an embodiment of this application.

Refer to FIG. 17, an embodiment of this application provides a data management apparatus 1700. The apparatus 1700 is deployed in the second storage system in the system 100 in FIG. 1, FIG. 3, or FIG. 5, or the apparatus 1700 is deployed in the second scheduling tool in the system 100 in FIG. 2, FIG. 4, or FIG. 6, or the apparatus 1700 is deployed in the second storage system in the method 700 in FIG. 7, the method 900 in FIG. 9, the method 1100 in FIG. 11, or the method 1200 in FIG. 12, or the apparatus is deployed in the first scheduling tool in the method 1300 in FIG. 13 or the method 1400 in FIG. 14. The apparatus 1700 includes:

- a receiving unit 1701, configured to receive a first row group, where the first row group is obtained by a first storage system based on first description information, the first description information is used to describe the first row group, the first row group is a row group stored by the first storage system within a specified time period, and the first row group includes at least one row of data; and
- a processing unit 1702, configured to store the first row group in the apparatus 1700.

Optionally, for a detailed implementation process in which the receiving unit 1701 receives the first row group, refer to the related content in step 1204 in the method 1200 in FIG. 12 or step 1304 in the method 1300 in FIG. 13. Details are not described herein again. Optionally, for a detailed implementation process in which the processing unit 1702 stores the first row group, refer to the related content in step 1204 in the method 1200 in FIG. 12 or step 1304 in the method 1300 in FIG. 13. Details are not described herein again.

Optionally, the first storage system and the apparatus 1700 are systems of a same type, and the receiving unit 1701 is configured to receive a file, where the file includes a data segment corresponding to the first row group, and the data segment includes the at least one row of data in the first row group.

The processing unit 1702 is configured to store the data segment in the apparatus 1700.

Optionally, for a detailed implementation process in which the receiving unit 1701 receives the file, refer to the related content in step 1204 in the method 1200 in FIG. 12 or step 1304 in the method 1300 in FIG. 13. Details are not described herein again.

Optionally, for a detailed implementation process in which the processing unit 1702 stores the data segment, refer to the related content in step 1204 in the method 1200 in FIG. 12 or step 1304 in the method 1300 in FIG. 13. Details are not described herein again.

Optionally, the processing unit 1702 is further configured to:

- generate second description information, where the second description information is used to describe the first row group; and
- store the second description information by using the apparatus 1700.

Optionally, for a detailed implementation process in which the processing unit 1702 generates the second description information and stores the second description information, refer to the related content in step 1204 in the method 1200 in FIG. 12 or step 1304 in the method 1300 in FIG. 13. Details are not described herein again.

Optionally, the file further includes a group identifier of the first row group and/or a column identifier corresponding to each column of data in the first row group, the second description information includes the group identifier of the first row group and a storage location of the data segment, and the storage location is obtained based on the column identifier corresponding to each column of data.

Optionally, the file further includes statistics information corresponding to each column of data in the first row group, and the second description information further includes the statistics information corresponding to each column of data.

Optionally, the file further includes first row status information, and the first row status information indicates undeleted data in the first row group; and the processing unit 1702 is further configured to:

store the first row status information by using the apparatus 1700; or delete deleted data in the first row group from the data segment based on the first row status information.

Optionally, for a detailed implementation process in which the processing unit 1702 stores the first row status information and deletes the deleted data in the first row group, refer to the related content in step 1204 in the method 1200 in FIG. 12 or step 1304 in the method 1300 in FIG. 13. Details are not described herein again.

Optionally, the receiving unit 1701 is configured to receive an insert statement, where the insert statement includes each row of data in the first row group.

The processing unit 1702 is configured to store each row of data in the first row group in the apparatus 1700.

Optionally, for a detailed implementation process in which the receiving unit 1701 receives the insert statement, refer to the related content in step 1204 in the method 1200 in FIG. 12 or step 1304 in the method 1300 in FIG. 13. Details are not described herein again.

Optionally, for a detailed implementation process in which the processing unit 1702 stores each row of data in the first row group, refer to the related content in step 1204 in the method 1200 in FIG. 12 or step 1304 in the method 1300 in FIG. 13. Details are not described herein again.

Optionally, the receiving unit 1701 is further configured to receive third description information, where the third description information is used to describe at least one row of data deleted by the first storage system from a second row group within the specified time period, the second row group is a row group stored in the first storage system, and the apparatus 1700 stores the second row group.

The processing unit 1702 is further configured to delete, based on the third description information, the at least one row of data stored in the apparatus 1700.

Optionally, for a detailed implementation process in which the receiving unit 1701 receives the third description information, refer to the related content in step 1204 in the method 1200 in FIG. 12 or step 1304 in the method 1300 in FIG. 13. Details are not described herein again.

Optionally, for a detailed implementation process in which the processing unit 1702 deletes the at least one row of data, refer to the related content in step 1204 in the method 1200 in FIG. 12 or step 1304 in the method 1300 in FIG. 13. Details are not described herein again.

Optionally, the receiving unit 1701 is further configured to receive a delete statement, where the delete statement includes a row identifier of each row of data in at least one row of data in a second row group, the at least one row of data in the second row group is data that is deleted by the first storage system within the specified time period, the second row group is a row group stored in the first storage system, and the apparatus 1700 stores the second row group.

The processing unit 1702 is further configured to delete each row of data from the apparatus 1700 based on the row identifier of each row of data.

Optionally, for a detailed implementation process in which the receiving unit 1701 receives the delete statement, refer to the related content in step 1204 in the method 1200 in FIG. 12 or step 1304 in the method 1300 in FIG. 13. Details are not described herein again.

Optionally, for a detailed implementation process in which the processing unit 1702 deletes each row of data, refer to the related content in step 1204 in the method 1200 in FIG. 12 or step 1304 in the method 1300 in FIG. 13. Details are not described herein again.

Optionally, each row of data in the first row group is data of a specified service.

Optionally, the first storage system is a database system or a data warehouse system, and the apparatus 1700 is a database system or a data warehouse system.

Both the receiving unit 1701 and the processing unit 1702 may be implemented by using software, or may be implemented by using hardware. For example, the following uses the processing unit 1702 as an example to describe an implementation of the processing unit 1702. Similarly, for an implementation of the receiving unit 1701, refer to the implementation of the processing unit 1702.

The unit is used as an example of a software functional unit, and the processing unit 1702 may include code running on a computing instance. The computing instance may include at least one of a physical host (computing device), a virtual machine, and a container. Further, there may be one or more computing instances. For example, the processing unit 1702 may include code running on a plurality of hosts/virtual machines/containers. It should be noted that the plurality of hosts/virtual machines/containers for running the code may be distributed in a same region, or may be distributed in different regions. Further, the plurality of hosts/virtual machines/containers for running the code may be distributed in a same availability zone (AZ), or may be distributed in different AZs. Each AZ includes one data center or a plurality of data centers that are geographically close to each other. Generally, one region may include a plurality of AZs.

Similarly, the plurality of hosts/virtual machines/containers for running the code may be distributed in a same virtual private cloud (VPC), or may be distributed in a plurality of VPCs. Generally, one VPC is set in one region. A communication gateway needs to be set in each VPC for communication between two VPCs in a same region or between VPCs in different regions. Interconnection between VPCs is implemented through the communication gateway.

The unit is used as an example of a hardware functional unit, and the processing unit 1702 may include at least one computing device, such as a server. Alternatively, the processing unit 1702 may be a device implemented by using an application-specific integrated circuit (ASIC) or a programmable logic device (PLD), or the like. The PLD may be a complex programmable logical device (CPLD), a field-programmable gate array (FPGA), a generic array logic (GAL), or any combination thereof.

The plurality of computing devices included in the processing unit 1702 may be distributed in a same region, or may be distributed in different regions. The plurality of computing devices included in the processing unit 1702 may be distributed in a same AZ, or may be distributed in different AZs. Similarly, the plurality of computing devices included in the processing unit 1702 may be distributed in a same VPC, or may be distributed in a plurality of VPCs. The plurality of computing devices may be any combination of computing devices such as a server, an ASIC, a PLD, a CPLD, an FPGA, and a GAL.

It should be noted that, in another embodiment, the processing unit 1702 may be configured to perform any step in the foregoing data management method, and the receiving unit 1701 may be configured to perform any step in the foregoing data management method. Steps implemented by the receiving unit 1701 and the processing unit 1702 may be specified as required. The receiving unit 1701 and the processing unit 1702 respectively implement different steps in the foregoing data management method, to implement all functions of the data management apparatus 1700.

In this embodiment of this application, because the first description information is used to describe the first row group, and the first row group is a row group stored by the first storage system within the specified time period, the receiving unit receives the first row group and the first row group is stored in the apparatus, thereby ensuring that data in the first storage system is consistent with data in the apparatus. Because the first row group is obtained from the first storage system based on the first description information after the first storage system stores the first row group, a process in which the first storage system stores data does not need to be changed, that is, an SQL access layer of the first storage system does not need to be modified, thereby reducing operation costs and maintenance difficulty.

Figure 18:
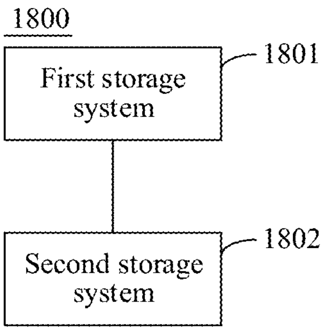
FIG. 18 is a diagram of a structure of another data management system according to an embodiment of this application.

Refer to FIG. 18, an embodiment of this application provides a data management system 1800. The system 1800 is a system to which the method 700 shown in FIG. 7, the method 900 shown in FIG. 9, the method 1100 shown in FIG. 11, the method 1200 shown in FIG. 12, the method 1300 shown in FIG. 13, or the method 1400 shown in FIG. 14 is applied. The system 1800 includes a first storage system 1801 and a second storage system 1802.

The first storage system 1801 is configured to obtain first description information, where the first description information is used to describe a first row group, the first row group is a row group stored by the first storage system 1801 within a specified time period, and the first row group includes at least one row of data.

The first storage system 1801 is further configured to send the first row group to the second storage system based on the first description information.

The second storage system 1802 is configured to store the first row group.

Optionally, for a detailed implementation process in which the first storage system

1801 obtains the first description information, refer to the related content in step 1201 in the method 1200 in FIG. 12 or step 1301 in the method 1300 in FIG. 13. Details are not described herein again.

Optionally, for a detailed implementation process in which the first storage system 1801 sends the first row group, refer to the related content in steps 1202 and 1203 in the method 1200 in FIG. 12 or steps 1302 and 1303 in the method 1300 in FIG. 13. Details are not described herein again.

Optionally, for a detailed implementation process in which the second storage system 1802 stores the first row group, refer to the related content in step 1204 in the method 1200 in FIG. 12 or step 1304 in the method 1300 in FIG. 13. Details are not described herein again.

Optionally, the first description information includes transaction information of a first transaction, and the first transaction is a transaction whose execution has been completed by the first storage system within the specified time period.

The first storage system 1801 is configured to: determine the first transaction; and select, from description information that has been generated by the first storage system 1801, the first description information including the transaction information of the first transaction.

Optionally, for a detailed implementation process in which the first storage system 1801 determines the first transaction and selects the first description information, refer to the related content in step 1201 in the method 1200 in FIG. 12 or step 1301 in the method 1300 in FIG. 13. Details are not described herein again.

Optionally, the first description information includes a storage location of a data segment corresponding to the first row group, the data segment includes data in the first row group, and the first storage system 1801 and the second storage system 1802 are storage systems of a same type.

The first storage system 1801 is configured to obtain the data segment based on the storage location.

The first storage system is further configured to send a file to the second storage system 1802, where the file includes the data segment.

The second storage system 1802 is configured to store the data segment.

Optionally, for a detailed implementation process in which the first storage system 1801 obtains the data segment, refer to the related content in step 1202 in the method 1200 in FIG. 12 or step 1302 in the method 1300 in FIG. 13. Details are not described herein again.

Optionally, for a detailed implementation process in which the first storage system 1801 sends the file, refer to the related content in step 1203 in the method 1200 in FIG. 12 or step 1303 in the method 1300 in FIG. 13. Details are not described herein again.

Optionally, for a detailed implementation process in which the second storage system 1802 stores the data segment, refer to the related content in step 1204 in the method 1200 in FIG. 12 or step 1304 in the method 1300 in FIG. 13. Details are not described herein again.

Optionally, the first description information includes a group identifier of the first row group and a storage location of a data segment corresponding to the first row group, and the data segment includes data in the first row group.

The first storage system 1801 is configured to obtain the first row group based on the group identifier and the storage location.

The first storage system 1801 is configured to send an insert statement to the second storage system 1802, where the insert statement includes each row of data in the first row group.

The second storage system 1802 is configured to store each row of data in the first row group.

Optionally, for a detailed implementation process in which the first storage system 1801 obtains the first row group, refer to the related content in step 1202 in the method 1200 in FIG. 12 or step 1302 in the method 1300 in FIG. 13. Details are not described herein again.

Optionally, for a detailed implementation process in which the first storage system 1801 sends the insert statement, refer to the related content in step 1203 in the method 1200 in FIG. 12 or step 1303 in the method 1300 in FIG. 13. Details are not described herein again.

Optionally, for a detailed implementation process in which the second storage system 1802 stores each row of data in the first row group, refer to the related content in step 1204 in the method 1200 in FIG. 12 or step 1304 in the method 1300 in FIG. 13. Details are not described herein again.

Both the first storage system 1801 and the second storage system 1802 may be implemented by using software, or may be implemented by using hardware. For example, the following describes an implementation of the first storage system 1801. Similarly, for an implementation of the second storage system 1802, refer to the implementation of the first storage system 1801.

In an example of a software functional unit, the first storage system 1801 may include code running on a computing instance. The computing instance may be at least one of computing devices such as a physical host (computing device), a virtual machine, and a container. Further, there may be one or more computing devices. For example, the first storage system 1801 may include code running on a plurality of hosts/virtual machines/containers. It should be noted that the plurality of hosts/virtual machines/containers for running the code may be distributed in a same region, or may be distributed in different regions. The plurality of hosts/virtual machines/containers for running the code may be distributed in a same AZ, or may be distributed in different AZs. Each AZ includes one data center or a plurality of data centers that are geographically close to each other. Generally, one region may include a plurality of AZs.

Similarly, the plurality of hosts/virtual machines/containers for running the code may be distributed in a same VPC, or may be distributed in a plurality of VPCs. Generally, one VPC is set in one region. A communication gateway needs to be set in each VPC for communication between two VPCs in a same region or between VPCs in different regions. Interconnection between VPCs is implemented through the communication gateway.

In an example of a hardware functional unit, the first storage system 1801 may include at least one computing device, such as a server. Alternatively, the first storage system 1801 may be a device implemented by using an ASIC, a PLD, or the like. The PLD may be a CPLD, an FPGA, a GAL, or any combination thereof.

The plurality of computing devices included in the first storage system 1801 may be distributed in a same region, or may be distributed in different regions. The plurality of computing devices included in the first storage system 1801 may be distributed in a same AZ, or may be distributed in different AZs. Similarly, the plurality of computing devices included in the first storage system 1801 may be distributed in a same VPC, or may be distributed in a plurality of VPCs. The plurality of computing devices may be any combination of computing devices such as a server, an ASIC, a PLD, a CPLD, an FPGA, and a GAL.

In this embodiment of this application, because the first description information obtained by the first storage system is used to describe the first row group, and the first row group is a row group stored by the first storage system within the specified time period, the first row group is sent to the second storage system based on the first description information. The second storage system stores the first row group, thereby ensuring that data in the first storage system is consistent with data in the second storage system. Because the first row group is obtained from the first storage system based on the first description information after the first storage system stores the first row group, a process in which the first storage system stores data does not need to be changed, that is, an SQL access layer of the first storage system does not need to be modified, thereby reducing operation costs and maintenance difficulty.

Figure 19:
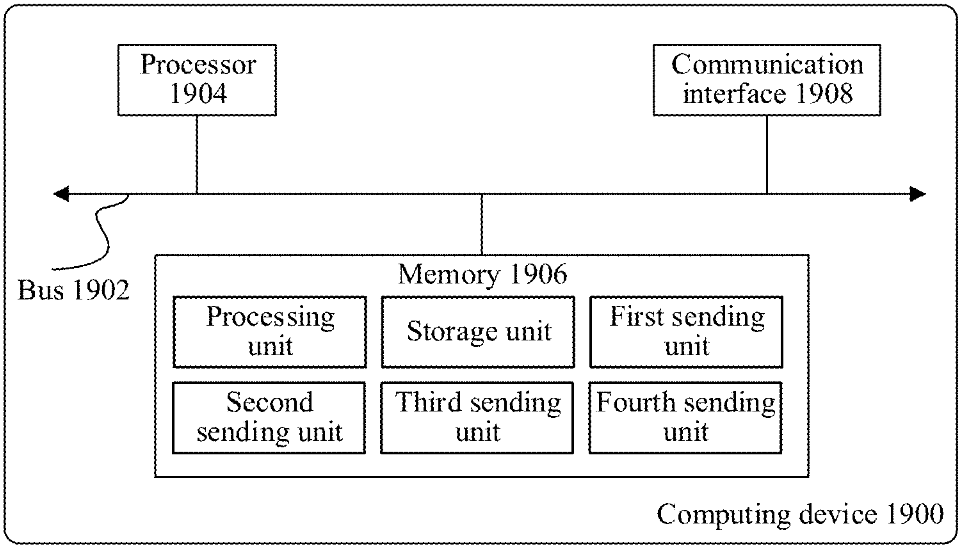
FIG. 19 is a diagram of a structure of a computing device according to an embodiment of this application.

As shown in FIG. 19, an embodiment of this application provides a computing device 1900. As shown in FIG. 19, the computing device 1900 includes a bus 1902, a processor 1904, a memory 1906, and a communication interface 1908. The processor 1904, the memory 1906, and the communication interface 1908 communicate with each other by using the bus 1902. The computing device 1900 may be a server or a terminal device. It should be understood that quantities of processors and memories in the computing device 1900 are not limited in this application.

The bus 1902 may be a peripheral component interconnect (PCI) bus, an extended industry standard architecture (EISA) bus, or the like. The bus may be classified into an address bus, a data bus, a control bus, and the like. For ease of representation, only one line represents the bus in FIG. 19, but this does not mean that there is only one bus or only one type of bus. The bus 1902 may include a path for transmitting information between components (for example, the memory 1906, the processor 1904, and the communication interface 1908) of the computing device 1900.

The processor 1904 may include any one or more of processors such as a central processing unit (CPU), a graphics processing unit (GPU), a microprocessor (MP), or a digital signal processor (DSP).

The memory 1906 may include a volatile memory, for example, a random access memory (RAM). The memory 1906 may alternatively include a non-volatile memory, for example, a read-only memory (ROM), a flash memory, a hard disk drive (HDD), or a solid-state drive (SSD).

Refer to FIG. 19, the memory 1906 stores executable program code, and the processor 1904 executes the executable program code to separately implement functions of the processing unit 1601, the storage unit 1602, the first sending unit 1603, the second sending unit 1604, the third sending unit 1605, and the fourth sending unit 1606 in the apparatus 1600 shown in FIG. 16, so as to implement the data management method. In other words, the memory 1906 stores instructions for performing the data management method.

Figure 20:
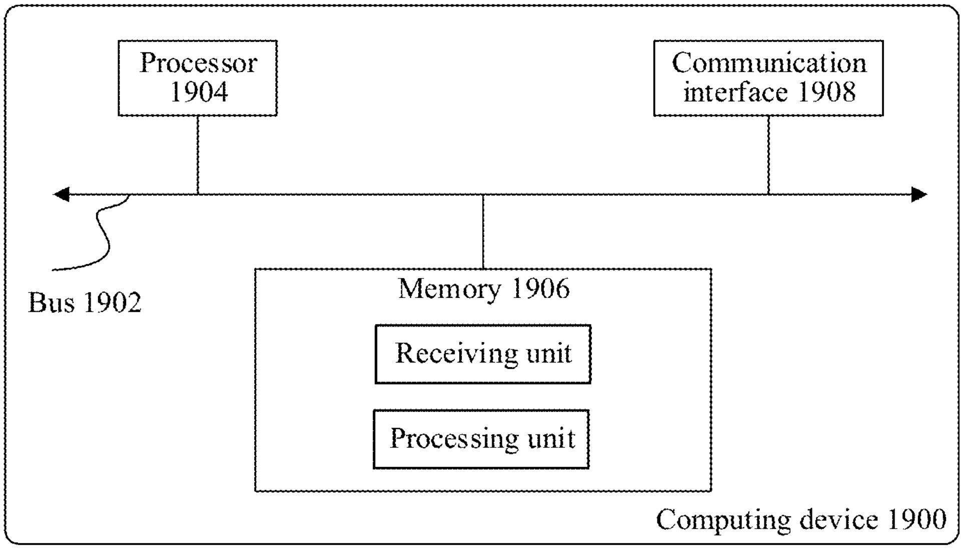
FIG. 20 is a diagram of a structure of another computing device according to an embodiment of this application.

Alternatively, refer to FIG. 20, the memory 1906 stores executable program code, and the processor 1904 executes the executable program code to separately implement functions of the receiving unit 1701 and the processing unit 1702 in the apparatus 1700 shown in FIG. 17, so as to implement the data management method. In other words, the memory 1906 stores instructions for performing the data management method.

The communication interface 1908 uses a transceiver module, for example, but not limited to, a network interface card or a transceiver, to implement communication between the computing device 1900 and another device or a communication network.

An embodiment of this application further provides a computing device cluster. The computing device cluster includes at least one computing device. The computing device may be a server, for example, a central server, an edge server, or a local server in a local data center. In some embodiments, the computing device may alternatively be a terminal device, for example, a desktop computer, a notebook computer, or a smartphone.

Figure 21:
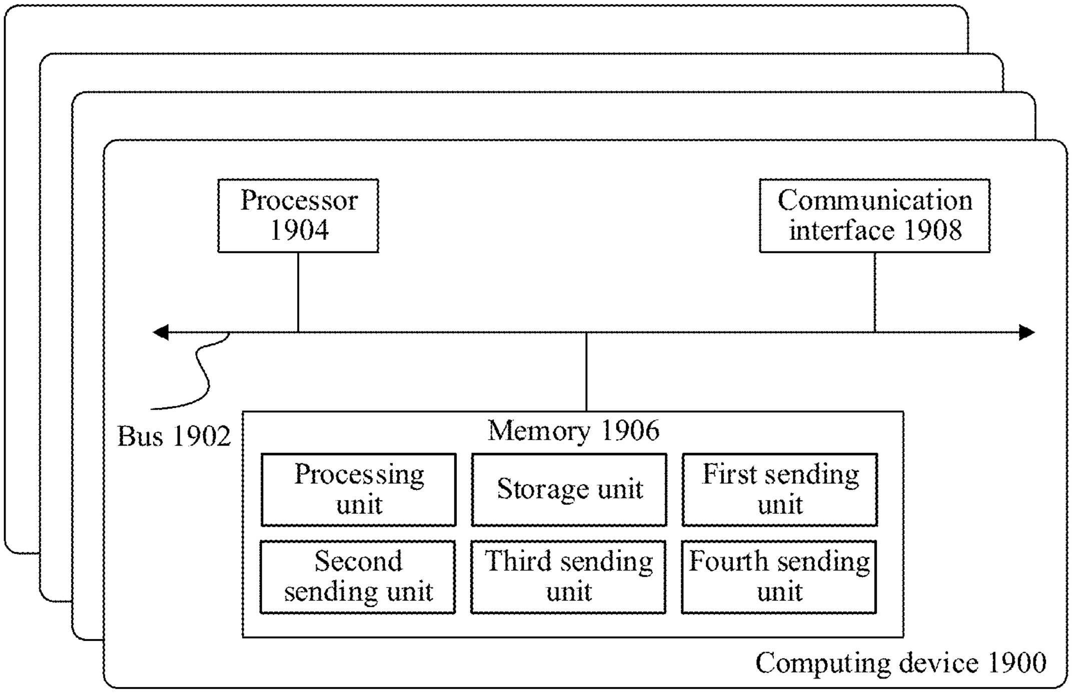
FIG. 21 is a diagram of a structure of a computing device cluster according to an embodiment of this application.
Figure 22:
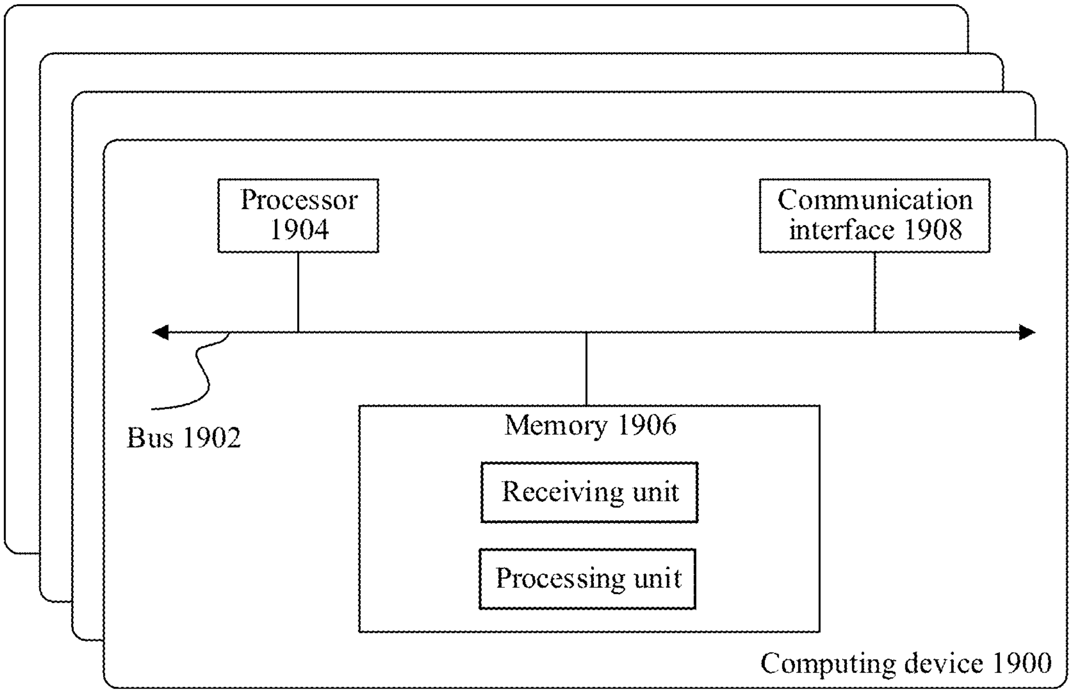
FIG. 22 is a diagram of a structure of another computing device cluster according to an embodiment of this application.

As shown in FIG. 21 or FIG. 22, the computing device cluster includes at least one computing device 1900. The memory 1906 in at least one computing device 1900 in the computing device cluster may store same instructions for performing the foregoing data management method.

In some possible implementations, the memory 1906 in the one or more computing devices 1900 in the computing device cluster may alternatively store some instructions for performing the foregoing data management method. In other words, a combination of the one or more computing devices 1900 may jointly execute instructions for performing the foregoing data management method.

Figure 23:
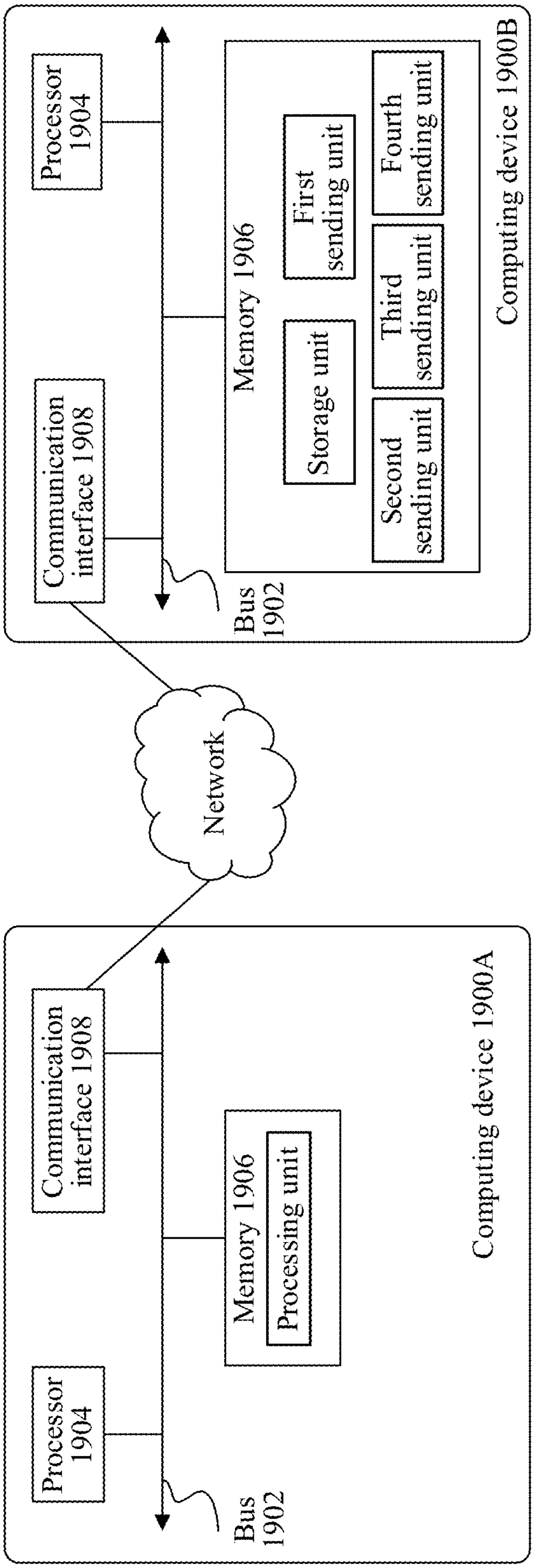
FIG. 23 is a diagram of a structure of another computing device cluster according to an embodiment of this application.
Figure 24:
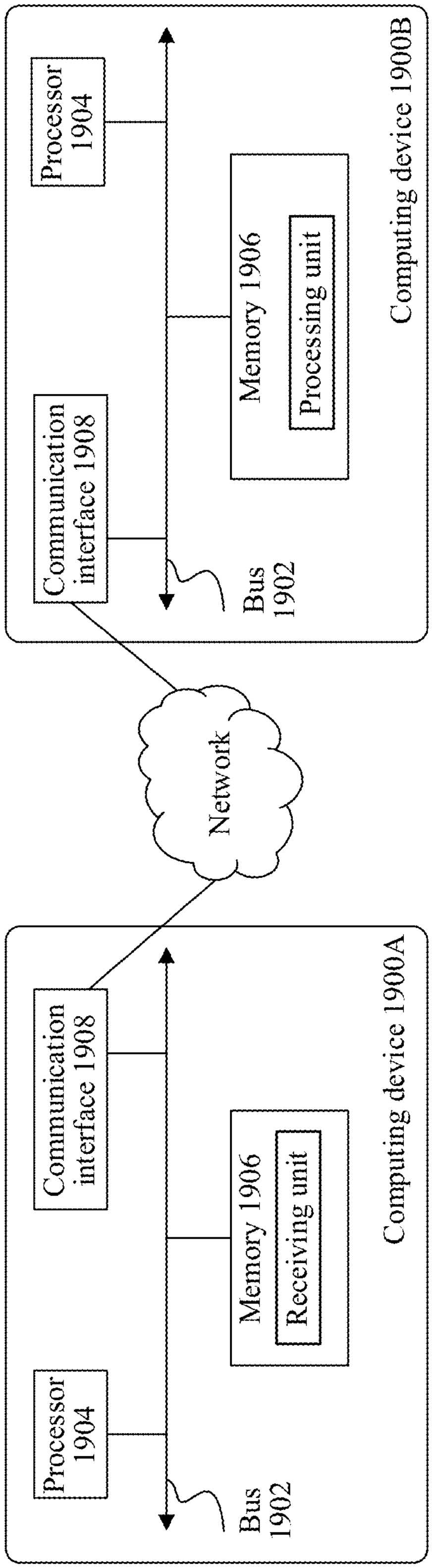
FIG. 24 is a diagram of a structure of another computing device cluster according to an embodiment of this application.

In some possible implementations, the one or more computing devices in the computing device cluster may be connected through a network. The network may be a wide area network, a local area network, or the like. FIG. 23 or FIG. 24 shows a possible implementation. As shown in FIG. 23 or FIG. 24, two computing devices 1900A and 1900B are connected through a network. Specifically, the two computing devices are connected to the network through communication interfaces of the computing devices.

In this possible implementation, the memory 1906 in the computing device 1900A stores instructions for performing the functions of the processing unit 1601 in the embodiment shown in FIG. 16. In addition, the memory 1906 in the computing device 1900B stores instructions for performing the functions of the storage unit 1602, the first sending unit 1603, the second sending unit 1604, the third sending unit 1605, and/or the fourth sending unit 1606 in the embodiment shown in FIG. 16.

Alternatively, in this possible implementation, the memory 1906 in the computing device 1900A stores instructions for performing the functions of the receiving unit 1701 in the embodiment shown in FIG. 17. In addition, the memory 1906 in the computing device 1900B stores instructions for performing the functions of the processing unit 1702 in the embodiment shown in FIG. 17.

It should be understood that the functions of the computing device 1900A shown in FIG. 23 or FIG. 24 may alternatively be completed by a plurality of computing devices 1900. Similarly, the functions of the computing device 1900B may alternatively be completed by a plurality of computing devices 1900.

An embodiment of this application further provides another computing device cluster. For a connection relationship between computing devices in the computing device cluster, refer to the connection manners of the computing device cluster in FIG. 21 and FIG. 23 similarly. Alternatively, for a connection relationship between computing devices in the computing device cluster, refer to the connection manners of the computing device cluster in FIG. 22 and FIG. 24 similarly. A difference lies in that the memory 1906 in the one or more computing devices 1900 in the computing device cluster may store same instructions for performing the foregoing data management method.

In some possible implementations, the memory 1906 in the one or more computing devices 1900 in the computing device cluster may alternatively store some instructions for performing the foregoing data management method. In other words, a combination of the one or more computing devices 1900 may jointly execute instructions for performing the foregoing data management method.

It should be noted that the memories 1906 in different computing devices 1900 in the computing device cluster may store different instructions for performing some functions of the foregoing data management system. In other words, instructions stored in the memories 1906 in different computing devices 1900 may implement functions of one or more apparatuses in the first storage system and the second storage system.

An embodiment of this application further provides a computer program product including instructions. The computer program product may be a software or program product that includes instructions and that can run on a computing device or be stored in any usable medium. When the computer program product runs on at least one computing device, the at least one computing device is enabled to perform the foregoing data management method.

An embodiment of this application further provides a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a DVD), a semiconductor medium (for example, a solid-state drive), or the like. The computer-readable storage medium includes instructions, and the instructions instruct a computing device to perform the foregoing data management method.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this application, but are not intended to limit this application. Any modification, equivalent replacement, or improvement made within the principle of this application should fall within the protection scope of this application.

What is claimed is:

1. A data management method, wherein the method is applied to a computer device and comprises:

obtaining first description information, wherein the first description information describes a first row group, the first row group is a row group stored by a first storage system within a specified time period, and the first row group comprises at least one row of data;

wherein obtaining the first description information comprises: taking a first snapshot of transactions being executed at an end moment of the specified time period to obtain a first transaction set; taking a second snapshot of transactions being executed at a start moment of the specified time period to obtain a second transaction set; determining a target transaction whose execution was completed within the specified time period by comparing the first transaction set and the second transaction set; and selecting, from a description information list generated by the first storage system, description information that includes transaction information of the target transaction as the first description information; and storing the first row group in a second storage system based on the first description information.

2. The method according to claim 1, wherein the first description information comprises transaction information of a first transaction, and the first transaction is a transaction whose execution has been completed by the first storage system within the specified time period; and wherein the obtaining the first description information comprises:

determining the first transaction; and selecting, from description information that has been generated by the first storage system, the first description information comprising the transaction information of the first transaction.

3. The method according to claim 2, wherein the determining the first transaction comprises:

obtaining a first transaction set, wherein the first transaction set comprises a transaction that is executed by the first storage system at an end moment of the specified time period, and the first transaction set indicates a transaction whose execution has been completed by the first storage system before the end moment; and determining the first transaction based on the first transaction set.

4. The method according to claim 3, wherein the determining the first transaction based on the first transaction set comprises:

obtaining a second transaction set, wherein the second transaction set comprises a transaction that is executed by the first storage system at a start moment of the specified time period, and the second transaction set indicates a transaction whose execution has been completed by the first storage system before the start moment; and determining the first transaction based on the first transaction set and the second transaction set.

5. The method according to claim 2, wherein the selecting, from the description information that has been generated by the first storage system, the first description information comprising the transaction information of the first transaction comprises:

selecting, based on a row group range, at least one piece of description information from the description information that has been generated by the first storage system, wherein the row group range comprises a row group operated by the first storage system within the specified time period, and a row group corresponding to a group identifier comprised in each piece of description information in the at least one piece of description information belongs to the row group range; and selecting, from the at least one piece of description information, the first description information comprising the transaction information of the first transaction.

6. The method according to claim 1, wherein the first description information comprises a storage location of a data segment corresponding to the first row group, the data segment comprises data in the first row group, and the first storage system and the second storage system are storage systems of a same type; and wherein the storing the first row group in the second storage system based on the first description information comprises:

obtaining the data segment based on the storage location; and sending a file to the second storage system, wherein the file comprises the data segment, and the file is used to trigger the second storage system to store the data segment.

7. The method according to claim 6, wherein the file further comprises first row status information, which indicates undeleted data in the first row group, and the file is further used to trigger the second storage system to store the first row status information or delete deleted data in the first row group from the data segment based on the first row status information.

8. The method according to claim 6, wherein the file further comprises a group identifier of the first row group and/or a column identifier corresponding to each column of data in the first row group, the file is further used to trigger the second storage system to obtain second description information based on the group identifier of the first row group and the column identifier corresponding to each column of data, and the second description information describes the first row group.

9. The method according to claim 8, wherein the file further comprises statistics information corresponding to each column of data, and the second description information further comprises the statistics information corresponding to each column of data.

10. The method according to claim 1, wherein the first description information comprises a group identifier of the first row group and a storage location of a data segment corresponding to the first row group, and the data segment comprises data in the first row group; and wherein the storing the first row group in the second storage system based on the first description information comprises:

obtaining the first row group based on the group identifier and the storage location; and sending an insert statement to the second storage system, wherein the insert statement comprises each row of data in the first row group, and the insert statement is used to trigger the second storage system to store each row of data in the first row group.

11. A computing device, comprising a processor and a memory, wherein the memory is configured to store processor-executable instructions, and the processor is configured to execute the instructions in the memory to:

obtain first description information, wherein the first description information describes a first row group, the first row group is a row group stored by a first storage system within a specified time period, and the first row group comprises at least one row of data;

wherein obtaining the first description information comprises: taking a first snapshot of transactions being executed at an end moment of the specified time period to obtain a first transaction set; taking a second snapshot of transactions being executed at a start moment of the specified time period to obtain a second transaction set; determining a target transaction whose execution was completed within the specified time period by comparing the first transaction set and the second transaction set; and selecting, from a description information list generated by the first storage system, description information that includes transaction information of the target transaction as the first description information; and store the first row group in a second storage system based on the first description information.

12. The computing device according to claim 11, wherein the first description information comprises transaction information of a first transaction, and the first transaction is a transaction whose execution has been completed by the first storage system within the specified time period; wherein the processor is configured to execute the instruction in the memory to:

determine the first transaction; and select, from description information that has been generated by the first storage system, the first description information comprising the transaction information of the first transaction.

13. The computing device according to claim 12, wherein the processor is configured to execute the instructions in the memory to:

obtain a first transaction set, wherein the first transaction set comprises a transaction that is executed by the first storage system at an end moment of the specified time period, and the first transaction set indicates a transaction whose execution has been completed by the first storage system before the end moment; and determine the first transaction based on the first transaction set.

14. The computing device according to claim 13, wherein the processor is configured to execute the instructions in the memory to:

obtain a second transaction set, wherein the second transaction set comprises a transaction that is executed by the first storage system at a start moment of the specified time period, and the second transaction set indicates a transaction whose execution has been completed by the first storage system before the start moment; and determine the first transaction based on the first transaction set and the second transaction set.

15. The computing device according to claim 12, wherein the processor is configured to execute the instructions in the memory to:

select, based on a row group range, at least one piece of description information from the description information that has been generated by the first storage system, wherein the row group range comprises a row group operated by the first storage system within the specified time period, and a row group corresponding to a group identifier comprised in each piece of description information in the at least one piece of description information belongs to the row group range; and select, from the at least one piece of description information, the first description information comprising the transaction information of the first transaction.

16. The computing device according to claim 11, wherein the first description information comprises a storage location of a data segment corresponding to the first row group, the data segment comprises data in the first row group, and the first storage system and the second storage system are storage systems of a same type; wherein the processor is configured to execute the instructions in the memory to:

obtain the data segment based on the storage location; and send a file to the second storage system, wherein the file comprises the data segment, and the file is used to trigger the second storage system to store the data segment.

17. The computing device according to claim 16, wherein the file further comprises first row status information, which indicates undeleted data in the first row group, and the file is further used to trigger the second storage system to store the first row status information or delete deleted data in the first row group from the data segment based on the first row status information.

18. The computing device according to claim 16, wherein the file further comprises a group identifier of the first row group and/or a column identifier corresponding to each column of data in the first row group, the file is further used to trigger the second storage system to obtain second description information based on the group identifier of the first row group and the column identifier corresponding to each column of data, and the second description information is used to describe the first row group.

19. The computing device according to claim 18, wherein the file further comprises statistics information corresponding to each column of data, and the second description information further comprises the statistics information corresponding to each column of data.

20. The computing device according to claim 11, wherein the first description information comprises a group identifier of the first row group and a storage location of a data segment corresponding to the first row group, and the data segment comprises data in the first row group; wherein the processor is configured to execute the instructions in the memory to:

obtain the first row group based on the group identifier and the storage location; and send an insert statement to the second storage system, wherein the insert statement comprises each row of data in the first row group, and the insert statement is used to trigger the second storage system to store each row of data in the first row group.

* * * * *